(12) United States Patent
Ready-Campbell et al.

(10) Patent No.: US 12,216,468 B2
(45) Date of Patent: Feb. 4, 2025

(54) QUALITY CONTROL OPERATION FOR AUTONOMOUS PILE DRIVING SYSTEM

(71) Applicant: Built Robotics Inc., San Francisco, CA (US)

(72) Inventors: Noah Austen Ready-Campbell, San Francisco, CA (US); Andrew Xiao Liang, San Francisco, CA (US); Gaurav Jitendra Kikani, San Francisco, CA (US)

(73) Assignee: Built Robotics Inc., San Francisco, CA (US)

( * ) Notice: Subject to any disclaimer, the term of this patent is extended or adjusted under 35 U.S.C. 154(b) by 0 days.

(21) Appl. No.: 18/085,901

(22) Filed: Dec. 21, 2022

(65) Prior Publication Data
US 2024/0210941 A1    Jun. 27, 2024

(51) Int. Cl.
*E02D 7/14* (2006.01)
*E02D 13/06* (2006.01)
*G05D 1/00* (2006.01)

(52) U.S. Cl.
CPC ............. *G05D 1/0088* (2013.01); *E02D 7/14* (2013.01); *E02D 13/06* (2013.01); *G05D 1/0274* (2013.01)

(58) Field of Classification Search
CPC ........ E02D 7/14; E02D 13/04; E02D 2600/10
See application file for complete search history.

(56) References Cited

U.S. PATENT DOCUMENTS

| | | | |
|---|---|---|---|
| 3,061,121 A | 10/1962 | Sutton | |
| 5,548,397 A | 8/1996 | Kool et al. | |
| 5,610,818 A | 3/1997 | Ackroyd et al. | |
| 6,543,551 B1 | 4/2003 | Sparks et al. | |
| 7,516,563 B2 | 4/2009 | Koch | |
| 9,756,771 B2 | 9/2017 | Redden | |
| 10,907,318 B2 * | 2/2021 | Flanigan | .......... E02D 7/24 |
| 11,301,790 B1 | 4/2022 | Damia-Levy | |

(Continued)

FOREIGN PATENT DOCUMENTS

| | | |
|---|---|---|
| AU | 2019340235 A1 | 12/2020 |
| CN | 113981867 A | 1/2022 |

(Continued)

OTHER PUBLICATIONS

U.S. Pat. No. 20160108598 (Year: 2016).*

(Continued)

*Primary Examiner* — Sunil Singh
(74) *Attorney, Agent, or Firm* — Fenwick & West LLP

(57) ABSTRACT

An autonomous off-road vehicle (AOV) autonomously performs a pile driving operation by driving a pile into the ground at a location identified by a pile plan map. The AOV detects one or more attributes of the pile using one or more sensors during or after the pile driving operation. The AOV determines whether the one or more attributes of the pile exceed respective tolerance thresholds. The AOV performs a quality control action in response to determining that the one or more attributes of the pile exceed the respective tolerance thresholds. The one or more attributes include one or more of a location and an orientation of the pile, and the quality control action is performed in response to determining that the location or the orientation of the pile exceeds the respective tolerance threshold.

20 Claims, 18 Drawing Sheets

(56) References Cited

U.S. PATENT DOCUMENTS

| | | | |
|---|---|---|---|
| 11,378,964 | B2 | 7/2022 | Wei |
| 11,788,247 | B1 | 10/2023 | Ready-Campbell et al. |
| 11,822,342 | B1 | 11/2023 | Ready-Campbell et al. |
| 2012/0136525 | A1 | 5/2012 | Everett et al. |
| 2013/0060461 | A1 | 3/2013 | Wong et al. |
| 2014/0074342 | A1 | 3/2014 | Wong et al. |
| 2014/0215953 | A1 | 8/2014 | Sawaki |
| 2014/0365084 | A1 | 12/2014 | Chan et al. |
| 2015/0233076 | A1 | 8/2015 | Montgomery |
| 2016/0108598 | A1* | 4/2016 | Waxse ............... E02D 7/06 702/33 |
| 2016/0371400 | A1 | 12/2016 | Challita et al. |
| 2020/0032489 | A1 | 1/2020 | Yamazaki et al. |
| 2020/0047337 | A1 | 2/2020 | Williams et al. |
| 2020/0217034 | A1* | 7/2020 | Karkheck ............. E02D 7/26 |
| 2020/0350850 | A1 | 11/2020 | Di Stefano |
| 2020/0394813 | A1 | 12/2020 | Theverapperuma et al. |
| 2021/0072760 | A1 | 3/2021 | Ready-Campbell et al. |
| 2021/0325875 | A1 | 10/2021 | Schlacks et al. |
| 2022/0121353 | A1 | 4/2022 | Cesic et al. |
| 2022/0163974 | A1 | 5/2022 | Davis |
| 2022/0244741 | A1 | 8/2022 | da Silva et al. |
| 2022/0379481 | A1 | 12/2022 | Brett |
| 2023/0098524 | A1 | 3/2023 | Tiwari et al. |
| 2023/0119845 | A1 | 4/2023 | O'Brien et al. |
| 2024/0025714 | A1 | 1/2024 | Bruto et al. |

FOREIGN PATENT DOCUMENTS

| | | | |
|---|---|---|---|
| CN | 113981969 | * | 1/2022 |
| CN | 113981969 | A | 1/2022 |
| ES | 1223094 | U | 1/2019 |
| ES | 2787948 | A1 | 10/2020 |
| JP | H01-209300 | A | 8/1989 |
| JP | H05-202522 | A | 8/1993 |
| JP | 2021-028764 | A | 2/2021 |
| WO | WO 2000/024666 | A1 | 5/2000 |
| WO | WO 2019/027311 | A1 | 2/2019 |
| WO | WO 2023/060318 | A1 | 4/2023 |

OTHER PUBLICATIONS

Chinese Translation 969, (Year: 2022).*
JP 5-25826 (Year: 1993).*
Youtube autonomous piling (Year: 2019).*
M. A. Mortenson Company, "Mortenson & Orteco Announce New Robotic Technology for Solar Energy Construction," Sep. 19, 2022, 3 pages, [Online] [Retrieved on Dec. 20, 2022] Retrieved from the Internet URL: <https://www.mortenson.com/newsroom/apds-solar-construction-technology>.
Orteco, "600J-800J-1000J—on excavator: Piledriver mounted on excavator," undated, 6 pages, [Online] [Retrieved on Dec. 20, 2022] Retrieved from the Internet URL: <https://www.orteco.com/en/scheda.php?id=201>.
Orteco, "Piledriver HD 800 crawler mounted: Piledriver crawler mounted," undated, 6 pages, [Online] [Retrieved on Dec. 20, 2022] Retrieved from the Internet URL: <https://www.orteco.com/en/scheda.php?id=199>.
Plotkin, K. Kym Plotkin's Post on Solar X Blade Pile installation mast system, 2021, 11 pages, [Online] [Retrieved on Dec. 20, 2022] Retrieved from the Internet URL: <https://www.linkedin.com/posts/kym-plotkin-72567099_sxbp-install-mast-showcase-activity-6864779122137292800-n81r?utm_source=share&utm_medium=member_desktop>.
Scully, J. "Mortenson deploys robotic pile distribution system to speed up solar project construction," PV Tech, Sep. 21, 2022, 4 pages, [Online] [Retrieved on Dec. 20, 2022] Retrieved from the Internet URL: <https://www.pv-tech.org/mortenson-deploys-robotic-pile-distribution-system-to-speed-up-solar-project-construction/>.
Universal Field Robots, "Creators of Autonomous Robots with Extraordinary Capabilities," undated, 5 pages, [Online] [Retrieved on Dec. 20, 2022] Retrieved from the Internet URL: <https://universalfieldrobots.com.au>.
Universal Field Robots, "The UFR Product Portfolio is Expanding," undated, 5 pages, [Online] [Retrieved on Dec. 20, 2022] Retrieved from the Internet URL: <https://universalfieldrobots.com.au/our-products/>.
United States Non-Final Office Action, U.S. Appl. No. 18/180,630, filed Nov. 9, 2023, 10 pages.
United States Non-Final Office Action, U.S. Appl. No. 18/085,893, filed Jun. 7, 2023, 9 pages.
Groundwork, STX GPS System, https://web.archive.org/web/20220415000000*/https://67Sa72ad-9537-472c-802a-c568d990efeb.usrfiles.com/ugd/678a72_0503eed7474b4c17b70fda5ac3273039.pdf, https://www.groundworkexperts.com/product-page/gps-system-for-solar-pile-installation (Year: 2022), 4 pages.
Hannigan, P.J., et al., "Design and Construction of Driven Pile Foundations," *Geotechnical Engineering Circular* No. 12, vol. 1, (Jul. 2016). Retrieved May 1, 2023, from https://www.fhwa.dot.gov/engineering/geotech/pubs/gec12/index.cfm (Year: 2016), 563 pages.
Stonex STX Suite —guidance solution "full automatic release", https://www.youtube.com/watch?v=hzbkH-IE_xY, accessed May 23, 2023, Publication Jan. 28, 2019 (Year: 2019), 1 page.
Stonex STX Suite, STX-Drill presentation at Intergeo Digital 2020, Nov. 3, 2020, https://www.youtube.com/watch?v=rY7L9Sr4Gqs, (Year: 2020), 4 pages.
United States Final Office Action, U.S. Appl. No. 18/085,881, filed Jun. 1, 2023, 16 pages.
United States Non-Final Office Action, U.S. Appl. No. 18/085,881, filed Apr. 20, 2023, 14 pages.
United States Non-Final Office Action, U.S. Appl. No. 18/085,888, filed May 19, 2023, 15 pages.
United States Final Office Action, U.S. Appl. No. 18/085,888, filed Jul. 21, 2023, 14 pages.
United States Non-Final Office Action, U.S. Appl. No. 18/085,888, filed Dec. 8, 2023, 16 pages.
United States Non-Final Office Action, U.S. Appl. No. 18/180,630, filed Jan. 25, 2024, 9 pages.
Vestil Manufacturing, Spring Scissor Tables (Year: 2019), 1 page.
International Search Report and Written Opinion, Patent Cooperation Treaty Application No. PCT/US2023/078487, mailing date Apr. 5, 2024, 18 pages.
United States Non-Final Office Action, U.S. Appl. No. 18/180,626, filed Aug. 22, 2023, 17 pages.
Built Robotics Inc., "Solar Piling," Oct. 1, 2021, four pages, [Retrieved from the Internet] <URL: https://www.builtrobotics.com/solutions/solar-piling>.
United States Office Action, U.S. Appl. No. 18/180,630, filed May 31, 2024, 12 pages.
United States Office Action, U.S. Appl. No. 18/462,140, filed Sep. 26, 2024, seven pages.
Youtube.com, "using a forklift to lift heavy beams of oak and steel," hudsoninbury, May 21, 2020, one page, <URL: https://www.youtube.com/watch?v=mH0CB8Obgd4>.

* cited by examiner

Access a pile plan map indicating a plurality of locations within a geographic area at which piles are to be installed
1110

Generate an obstacle map indicating locations of obstacles within the geographic area
1120

Autonomously navigate the AOV to a first location of the plurality of locations using the pile plan map
1130

In response to driving a pile into the ground at the first location, modify the obstacle map to include a representation of the pile at the first location
1140

```
┌─────────────────────────────────────────────────────────────────┐
│ Access a pile plan map indicating a plurality of locations in a │
│           geographic area at which piles are to be installed    │
│                              1210                                │
└─────────────────────────────────────────────────────────────────┘
                                  ↓
┌─────────────────────────────────────────────────────────────────┐
│ Select a first location and a second location from the plurality│
│                of locations using the pile plan map              │
│                              1220                                │
└─────────────────────────────────────────────────────────────────┘
                                  ↓
┌─────────────────────────────────────────────────────────────────┐
│        Autonomously navigate the AOV to the first location       │
│                              1230                                │
└─────────────────────────────────────────────────────────────────┘
                                  ↓
┌─────────────────────────────────────────────────────────────────┐
│       Autonomously load a first pile onto a driving tool of the AOV │
│                              1240                                │
└─────────────────────────────────────────────────────────────────┘
                                  ↓
┌─────────────────────────────────────────────────────────────────┐
│   Autonomously drive the first pile into the ground at the first location │
│                              1250                                │
└─────────────────────────────────────────────────────────────────┘
                                  ↓
┌─────────────────────────────────────────────────────────────────┐
│       Autonomously navigate the AOV to the second location       │
│                              1260                                │
└─────────────────────────────────────────────────────────────────┘
                                  ↓
┌─────────────────────────────────────────────────────────────────┐
│         Autonomously load a second pile onto the driving tool    │
│                              1270                                │
└─────────────────────────────────────────────────────────────────┘
                                  ↓
┌─────────────────────────────────────────────────────────────────┐
│ Autonomously drive the second pile into the ground at the second │
│                    location using the driving tool               │
│                              1280                                │
└─────────────────────────────────────────────────────────────────┘
```

```
┌─────────────────────────────────────────────────────────────────────┐
│ Access a pile plan map indicating a plurality of locations in a     │
│ geographic area at which piles are to be installed                  │
│                              1310                                   │
└─────────────────────────────────────────────────────────────────────┘
                                  │
                                  ▼
┌─────────────────────────────────────────────────────────────────────┐
│ Identify a first set of locations from the plurality of locations   │
│ and a first set of piles to be driven into the ground at the first  │
│ set of locations using the pile plan map  1320                      │
└─────────────────────────────────────────────────────────────────────┘
                                  │
                                  ▼
┌─────────────────────────────────────────────────────────────────────┐
│ Identify an order for driving the first set of piles into the       │
│ ground and a pile type for each of the first set of piles           │
│                              1330                                   │
└─────────────────────────────────────────────────────────────────────┘
                                  │
                                  ▼
┌─────────────────────────────────────────────────────────────────────┐
│ Generate basket assembly instructions for assembling the first set  │
│ of piles into a basket based on the identified order and the        │
│ identified pile types                                               │
│                              1340                                   │
└─────────────────────────────────────────────────────────────────────┘
```

Autonomously perform a pile driving operation by driving a pile into the ground at a location identified by a pile plan map
1410

↓

Detect one or more attributes of the pile using one or more sensors during or after the pile driving operation
1420

↓

Determine whether the one or more attributes of the pile exceed respective tolerance thresholds
1430

↓

Perform a quality control action in response to determining that the one or more attributes of the pile exceed the respective tolerance thresholds
1440

FIG. 14

QUALITY CONTROL OPERATION FOR AUTONOMOUS PILE DRIVING SYSTEM

TECHNICAL FIELD

This disclosure relates to driving piles into the ground, and, more specifically, to various autonomous operations related to autonomous pile driving.

BACKGROUND

Heavy equipment vehicles such as backhoes, loaders, and excavators may be used to perform a variety of earthwork operations (e.g., pile driving, drilling, excavating, digging, jackhammering, demolishing, and the like). Currently, operation of these vehicles is very expensive as each vehicle requires a manual operator on the vehicle during the entire earthwork operation. Another complication stems from an insufficient labor force skilled enough to meet the demand for operating these vehicles. Because these vehicles must be operated manually, the operations can only be performed during the day, extending the duration of projects, and further increasing overall costs. Also, dependence of current vehicles on manual operators increases the risk of human error during operations and reduces the quality of work done at the site.

SUMMARY

In one embodiment, a method includes a plurality of steps performed by an autonomous off-road vehicle (AOV). The steps include a step of accessing a pile plan map indicating a plurality of locations within a geographic area at which piles are to be installed. The steps further include a step of generating an obstacle map indicating locations of obstacles within the geographic area. The steps further include a step of autonomously navigating by the AOV to a first location of the plurality of locations using the pile plan map. And the steps further include, in response to driving a pile into the ground at the first location, a step of modifying the obstacle map to include a representation of the pile at the first location.

In another embodiment, a method includes a plurality of steps performed by an autonomous off-road vehicle. The steps include a step of accessing a pile plan map indicating a plurality of locations in a geographic area at which piles are to be installed. The steps further include a step of selecting a first location and a second location from the plurality of locations using the pile plan map. The steps further include a step of autonomously navigating the AOV to the first location. The steps further include a step of autonomously loading a first pile onto a driving tool of the AOV. The steps further include a step of autonomously driving the first pile into the ground at the first location using the driving tool. The steps further include a step of autonomously navigating the AOV to the second location. The steps further include a step of autonomously loading a second pile onto the driving tool. And the steps further include a step of autonomously driving the second pile into the ground at the second location using the driving tool.

In another embodiment, a method includes a plurality of steps. The steps include a step of accessing a pile plan map indicating a plurality of locations in a geographic area at which piles are to be installed. The steps further include a step of identifying a first set of locations from the plurality of locations and a first set of piles to be driven into the ground at the first set of locations using the pile plan map. The steps further include a step of identifying an order for driving the first set of piles into the ground and a pile type for each of the first set of piles. And the steps further include a step of generating basket assembly instructions for assembling the first set of piles into a basket based on the identified order and the identified pile types.

In yet another embodiment, a method includes a plurality of steps performed by an autonomous off-road vehicle (AOV). The steps include a step of autonomously performing a pile driving operation by driving a pile into the ground at a location identified by a pile plan map. The steps further include a step of detecting one or more attributes of the pile using one or more sensors during or after the pile driving operation. The steps further include a step of determining whether the one or more attributes of the pile exceed respective tolerance thresholds. And the steps further include a step of performing a quality control action in response to determining that the one or more attributes of the pile exceed the respective tolerance thresholds.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates an exemplary pile plan map, in accordance with some embodiments.

FIG. 11 is a flow chart illustrating a process for generating basket assembly instructions, in accordance with some embodiments.

FIG. 12 is a flow chart illustrating a process of autonomously driving a plurality of piles into the ground, in accordance with some embodiments.

FIG. 13 is a flow chart illustrating a process of performing an autonomous quality control operation for autonomously driven piles, in accordance with some embodiments.

FIG. 14 is a flow chart illustrating a process of performing an autonomous obstacle map creation operation based on autonomously driven piles, in accordance with some embodiments.

DETAILED DESCRIPTION

Figure 1:
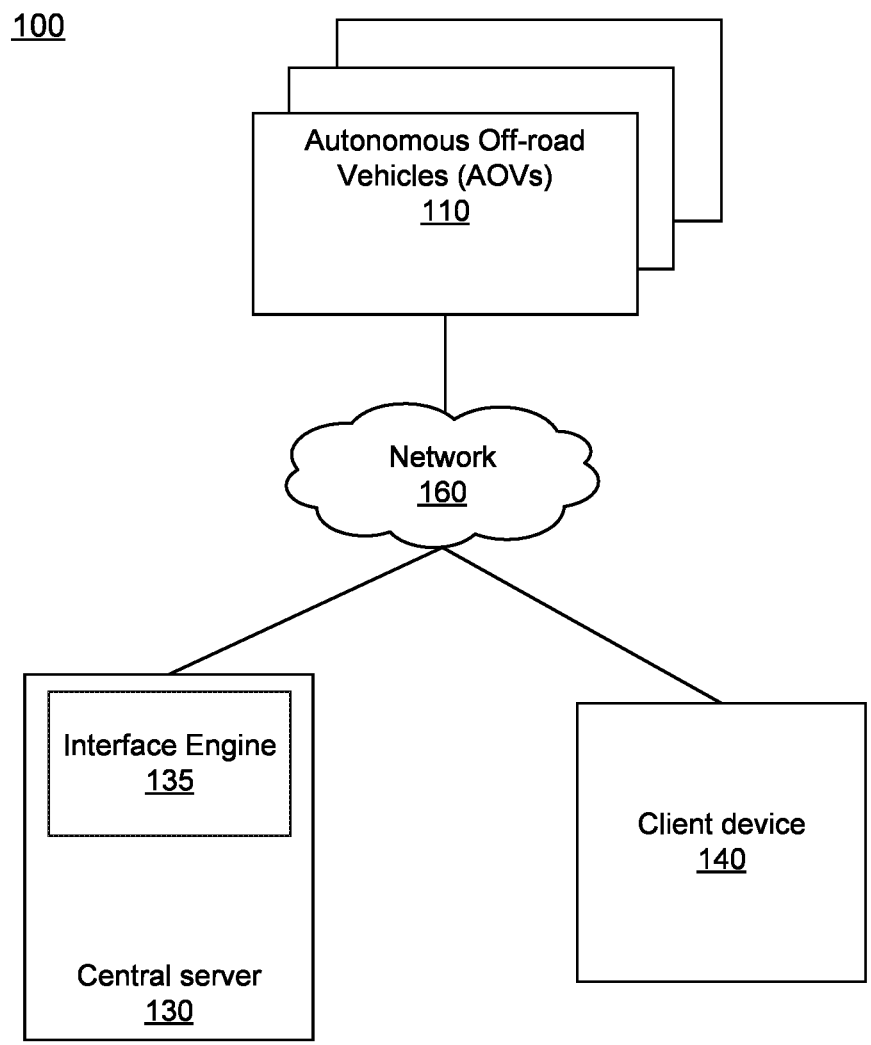
FIG. 1 illustrates an autonomous off-road vehicle (AOV) system environment, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

This disclosure pertains to autonomous off-road vehicles (AOVs) for performing various autonomous operations related to pile driving. As used herein, "AOV" refers to any vehicle, apparatus, multi-unit system, or robot, that moves and/or operates autonomously. The AOVs are configured to operate on paved surfaces as well as in off-road environments (e.g., on surfaces other than paved roadway). The AOVs may include any tracked vehicle, construction vehicle, robot, tractor, excavator, bulldozer, transport vehicle, delivery vehicle, distribution vehicle, and the like. Example off-road environments include solar farms, dirt roads, fields, agricultural sites, rocky or gravel terrain, construction sites, forest or wooded sites, hill or mountain trails or sites, underground sites, indoor sites, rooftops, and the like. As used herein, "autonomous" refers to the ability of the off-road vehicle to operate without constant human supervision, for instance enabling the off-road vehicle to move, navigate, perform a function, and/or make a decision without explicitly receiving instructions from a human operator.

Pile driving operations involve driving piles into the ground to build structures supported on top of the piles. Piles (e.g., stakes, rebars, piers, poles, posts, beams, etc.) may be of different types based on features like length, dimensions, shape or design, bolt hole pattern, material, weight, thickness or steel gauge, and the like. Non-limiting examples of different pile designs or shapes include ground screws, helical piles, c-channel piles, sheet piles, wide flange beam piles, H-beam piles, I-beam piles. Non-limiting examples of different pile materials include metal, wood, concrete, precast concrete, reinforced concrete, synthetic material, and the like. Each pile type (having a specific configuration or set of characteristics) may have a corresponding color code or other identification code. As used herein, "ground" may refer to any earth or non-earth substrate where piles are to be installed. For example, a large collection (e.g., hundreds, thousands, tens of thousands, etc.) of photovoltaic (PV) solar panels may be installed in a geographic area to create a solar farm by driving a large number of piles into the ground, mounting individual solar panels on top of the driven piles, and electrically interconnecting the solar panels to generate large amounts of electricity from solar power. Techniques disclosed herein look to automate the pile driving process by operating AOVs (e.g., an AOV or a fleet of multiple AOVs operating simultaneously and communicating with a central server) that are configured to perform a plurality of autonomous operations related to pile driving (e.g., path planning operation, navigation operation, pile basket assembly operation, pile basket loading operation, pile basket distribution operation, pile distribution operation, pile loading operation, pile driving operation, obstacle map creation operation, quality control operation, pile removal operation, and the like).

The systems and methods disclosed herein look to automate the process of driving a plurality of piles at respective locations into the ground using one or more AOVs based on a pile plan map. As used herein, the "pile plan map" (e.g., see FIG. 4) may be a digital representation indicating a plurality of locations in a geographic area (e.g., a lot, plot, tract, parcel of land, indoor site, elevated site, etc.) in which piles are intended to be driven and located. The pile plan map may specify locations (e.g., geolocations, geographic (x,y) or GPS coordinates) in the geographic area where the respective piles are to be driven, and the type (e.g., thickness, length, weight, shape or design, material, bolt hole pattern, etc.) of the pile to be driven at the location. For each location, the pile plan map may also specify other pile parameters (e.g., length, reveal height, orientation, tilt, tolerance range or threshold, number of piles, type of each pile or any other type of object that is to be located at or driven into the ground in addition to the pile at the location, etc.) for driving of the pile at the location. The pile parameters in the pile plan map may thus define the intended state of the pile at the location after the installation of the pile at the location is complete. It should be noted that reference herein to the movement, manipulation, driving, adjustment, or any other manipulation of a pile can apply equally to ground screws, beams, stakes, or any other object that can be inserted into the ground.

Based on the pile plan map, the systems and methods enable the performance of the different autonomous operations. For example, based on the pile plan map, the systems and methods may perform a path planning operation for a given AOV. In the path planning operation, the systems and methods may select a set of locations, where piles are to be installed by the AOV, from among a plurality of locations indicated in the pile plan map. The set of locations may be selected to optimize predetermined criteria. For example, the set of locations may be selected to minimize navigation or driving time and/or cost, minimize greenhouse gas emissions, maximize efficiency, reduce downtime (e.g., non-pile-driving time). The set of locations may also be selected based on pile availability, based on an obstacle map, or to ensure accessibility of each location specified by the pile plan map for subsequent pile driving by the same or other AOVs.

Based on the selected set of locations, the systems and methods may perform a basket assembly operation. For example, the systems and methods may generate instructions for assembling a set of piles in a specific order based on the order in which the piles are to be driven into the ground at the selected set of locations. In some embodiments, based on the specific order for the set of piles in the generated instructions, a pile basket assembly robot (e.g., AOV) may assemble and load the set of piles that may have different pile types in the specified order into a pile set holder (e.g., basket, cartridge, housing, etc.).

As a result, during the subsequent pile driving operation at each location specified by the path plan, a pile type of the pile that is accessible to a pile driving AOV from the basket of piles (e.g., the top pile in a stack of piles in the basket) will match the pile type of the pile that is to be driven into the ground at that location per the pile plan map. That is, the "correct" pile is always accessible to the AOV when it arrives at the target location. Thus, based on the generated instructions, piles of different types may be loaded in the designated order into the basket autonomously (e.g., by the pile basket assembly robot or AOV). In other embodiments, based on the generated basket assembly instructions, piles of different types may be loaded in the designated order into the basket manually (e.g., by a third-party vendor that receives the instructions and assembles the piles of the different types in the specified order into the respective baskets and delivers the assembled baskets ready for use during autonomous pile driving). As a result of the basket assembly operation, conventional manual steps of material distribution to access the correct pile at the target location or prior material distribution need not be performed, thereby eliminating significant amounts of manual labor, and reducing error during construction. As used herein, a "basket" of piles or "pile basket" refers to anything (e.g., cartridge, cassette, housing, container, bin, silo, etc.) in which a set of piles of different types can be carried or moved.

In some embodiments, instead of performing the basket assembly operation, the piles of the different types may be assembled in respective baskets and loaded onto a carriage so that a pile of each type remains always accessible to the loading and/or driving tool of the AOV. In such embodiments, based on the type of pile that is to be driving into the ground at each location, the pile loading tool may be actuated at each location to corresponding baskets having one or more piles of respective types for driving into the ground. For example, at a first location where a first type of pile is to be installed, the pile loading tool may be autonomously actuated to load a pile of the first type from a location (e.g., a first basket) storing the first type of piles. And at a second location where a second type of pile is to be installed, the pile loading tool may be autonomously actuated to load a pile of the second type from a location (e.g., a second basket the same or separate from the first basket) storing the second type of piles.

The systems and methods may further be configured to perform autonomous pile driving for each location of the pile plan map. Autonomous pile driving may include an autonomous navigation operation, an autonomous pile loading operation, and an autonomous pile driving operation (performed by a same/single AOV, or by a multi-vehicle system). In the autonomous navigation operation, an AOV (which may be the same as or different from the AOV that carries the basket of the ordered set of piles) may navigate autonomously (based on a path plan determined by the path planning operation) to a first location where a first one of the set of piles in the loaded basket is to be driven.

In the autonomous pile loading operation, the pile driving AOV may autonomously load the first one of the set of piles from the basket (e.g., the first or top pile in the stack of piles in the basket) onto a driving tool of the AOV to drive the pile into the ground. In the autonomous pile driving operation, the AOV may autonomously drive the pile loaded onto the driving tool of the AOV into the ground. In performing the autonomous pile driving operation at the location, the AOV may utilize the pile parameters for the location included in the pile plan map and, in some embodiments, control actuation parameters of the driving tool of the AOV based on the pile parameters to achieve the intended state (e.g., pile height, plumbness, orientation, location, etc.) of the pile at the location after the autonomous pile driving operation. The AOV may then similarly perform repeated autonomous pile driving operations for subsequent locations per the path plan. A fleet of AOVs may simultaneously and continuously perform the autonomous pile driving operations at respective sets of locations from among the plurality of locations of the same pile plan map to complete large-scale pile driving projects quickly and accurately, and with high efficiency and reduced costs.

During or after the pile driving operation, the pile driving AOV (or a separate quality control AOV) may perform a quality control operation to ensure that the driving of the pile at each location complies with the corresponding pile parameters dictated by the pile plan map. For example, the AOV may operate one or more sensors at a predetermined frequency during the pile driving operation to obtain sensor data and determine whether one or more attributes of the pile (being) installed at the location are within corresponding tolerance thresholds. The one or more attributes of the pile that may be monitored based on the sensor data may include the (actual) horizontal location of the pile driven into the ground, the vertical location of the top of the pile (e.g., to detect an over-driven pile, or an under-driven pile; also referred to as reveal height), pile refusal condition, plumbness or verticality of the pile relative to ground, orientation of the pile (e.g., 3D orientation of the bolt holes of the pile), rotation or yaw of the pile relative to the ground, deformation (e.g., bend, dents, etc.) of the pile, damage (e.g., crack or other manufacturing defect) to the pile, and the like.

The quality control operation may determine performance of one or more quality control actions based on quality control condition data (e.g., pile attribute data) generated based on the determination regarding one or more of the pile attributes being outside corresponding tolerance thresholds. For example, the quality control action may be to flag the location in association with the corresponding quality control condition data in a quality control map for subsequent manual inspection. Another example of the action may be to stop the pile driving operation prior to its completion. As yet another example, the action may be to modify actuation parameters of the pile driving tool to perform corrective action during the pile driving operation to attempt to bring an offending attribute back within the corresponding tolerance threshold (e.g., change the angle of impact of the driving tool on top of the pile being driven into the ground to bring the plumbness of the pile closer to a desired plumbness as dictated by the pile parameters in the pile plan map).

Based on the pile driving operation, the systems and methods according to the present disclosure may also generate an obstacle map indicating locations of obstacles within the geographic area. As used herein, the "obstacle map" may be a digital representation indicating obstacles or objects within the geographic area. For each obstacle tagged in the map, the obstacle map may include attributes of the obstacle such as identity, type or category of the object, physical characteristics of the object, 3D location of the object, depth of the object, and the like. The obstacle map may thus convey non-navigable regions for the AOV within the geographic area and may include as-built obstacles like piles that have been installed by the AOV at locations prescribed by the pile plan map. The as-built obstacles may be added to the obstacle map based on the pile driving operation performed by the AOV. That is, in response to the pile driving operation of driving the pile at a first location, the obstacle map may be modified to include a representation of the pile at the first location. Subsequent pile driving operations at subsequent locations may result in similar modifications to the obstacle map to include representations of the piles at the subsequent locations. The representations of the piles at the respective locations may include obstacle attributes such as horizontal location of the pile, vertical location of the top of the pile, 3D discretized pile volume data, and the like. The obstacle map may also include data regarding other types of static (e.g., inverters, torque tubes, trenches, dirt piles, electric poles, etc.) or dynamic (e.g., other AOVs or vehicles, pedestrians, etc.) obstacles (e.g., non-pile obstacles). The non-pile obstacles may be added to the obstacle map perceptually based on sensor data captured by the AOV.

Techniques disclosed herein may also look to synchronize the obstacle map based on operations being performed by multiple AOVs and use the synchronized and continuously updated, dynamic obstacle map to avoid obstacles while performing the different operations by the multiple AOVs like the path planning operation, the navigation operation, the pile loading operation, AOV tool actuation operation, the pile driving operation, and the like.

Example Autonomous Off-Road Vehicle System Environment

FIG. 1 illustrates an autonomous off-road vehicle system environment 100, according to some embodiments. The environment 100 of FIG. 1 includes one or more autonomous off-road vehicles 110 ("AOV" or simply "vehicle" hereinafter), a central server 130, and a client device 140, each communicatively coupled via a network 160. It should be noted that in other embodiments, the environment 100 may include different, fewer, or additional components than those illustrated in FIG. 1. For instance, the client device 140 and the central server 130 may be the same device.

Each AOV 110 of FIG. 1 may be a vehicle (e.g., item of heavy equipment, vehicle, apparatus, system, robot, and the like) that is configured to move and/or operate autonomously and that is configured to communicate with the central server 130. Examples of AOVs 110 within the scope of this description include, but are not limited to pile loaders, pile drivers, pile driving rigs, pile distribution vehicles, pile basket assembly robots, loaders such as backhoe loaders, track loaders, wheel loaders, skid steer loaders, scrapers, graders, bulldozers, compactors, excavators, mini-excavators, trenchers, skip loaders, tracked vehicles, construction vehicles, tractors, transport vehicles, delivery vehicles, distribution vehicles, and the like. Collectively, AOVs 110 may correspond to an AOV fleet that includes one or more of each of different types of AOVs 110 that respectively have different functionality. Example embodiments and functional components of the AOV 110 are described in greater detail below in at least FIGS. 3A-3B.

The central server 130 is a computing system located remotely from the AOV 110. In some embodiments, the central server is a web server or other computer configured to receive data from and/or send data to one or more AOVs 110 within the environment 100. In some embodiments, the central server 130 receives information from the AOV 110 (e.g., obstacle data, quality control condition data, sensor data, etc.) indicating a location of the AOV 110, a result of a function or operation being performed by the AOV 110, a state of one or more vehicles, information describing the surroundings of the AOV 110, and the like. In some embodiments, the central server 130 may receive a real-time feed of data from the AOV 110, such as a real-time video feed of the environment surrounding the AOV. In some embodiments, the central server 130 can provide information to the AOV 110, such as an instruction to perform an operation or function (e.g., pile driving operation on a set of locations), a navigation instruction (such as a route), synced obstacle data, and the like. In some embodiments, the central server 130 can enable a remote operator to assume manual control of the AOV 110 and provide manual navigation or operation instructions to the AOV. In some embodiments, some of the functionality of the AOV 110 described below in connection with, e.g., FIGS. 3A-3B may be subsumed by the central server 130. For example, sensor data from the AOV 110 may be transmitted to the central server 130, and the central server 130 may subsume the functionality corresponding to one or more of the obstacle map creation operation, the quality control operation, and the like.

The central server 130 may include an interface engine 135 configured to generate one or more interfaces for viewing by a user (such as a user of the central server 130 or a user of the client device 140). The user can be a remote operator of the AOV 110, can be an individual associated with the environment 100 (such as a supervisor, a consultant, etc.), can be an individual associated with the AOV 110 (such as an operator, a repairman, an on-site coordinator, or the like), or can be any other suitable individual. The interface engine 135 can be used by a user to provide one or more instructions to an AOV 110, such as autonomous navigation instructions, operation or function instructions, remote piloting instructions, and the like. The interface engine 135 can generate a user interface displaying information associated with the AOV 110, other vehicles, or the environment 100. For instance, the user interface can include a map illustrating a location and/or movement of each of the AOVs 110 within the geographic area, a path plan generated for each AOV 110, a respective set of locations where piles will be driven by each AOV 110, a current status of the AOV 110, a remaining number and type of piles available to each AOV 110, any notifications or other data received from each AOV 11, and the like. The user interface can display notifications generated by and/or received from the AOV 110, for instance, within a notification feed, as pop-up windows, using icons within the map interface, and the like. By communicatively coupling to multiple AOVs 110, the central server 130 beneficially enables one user to track, monitor, and/or control multiple AOVs simultaneously.

The client device 140 is a computing device, such as a computer, a laptop, a mobile phone, a tablet computer, or any other suitable device configured to receive information from or provide information to the central server 130. The client device 140 includes a display configured to receive information from the interface engine 135, that may include information representative of one or more of the AOVs 110 or the environment 100. The client device 140 can also generate notifications (e.g., based on notifications generated by an AOV 110) for display to a user. The client device 140 can include input mechanisms (such as a keypad, a touch-screen monitor, and the like), enabling a user of the client device to provide instructions to a selected one of the AOVs 110 (via the central server 130). It should be noted that although the client device 140 is described herein as coupled to an AOV 110 via the central server 130, in practice, the client device 140 may communicatively couple directly to the AOV (enabling a user to receive information from or provide instructions to the AOV 110 without going through the central server 130).

As noted above, the systems or components of FIG. 1 are configured to communicate via a network 160, which may include any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, all or some of the communication links of the network 160 may be encrypted using any suitable technique or techniques.

Example Autonomous Off-Road Vehicle Designs

Figure 2A:
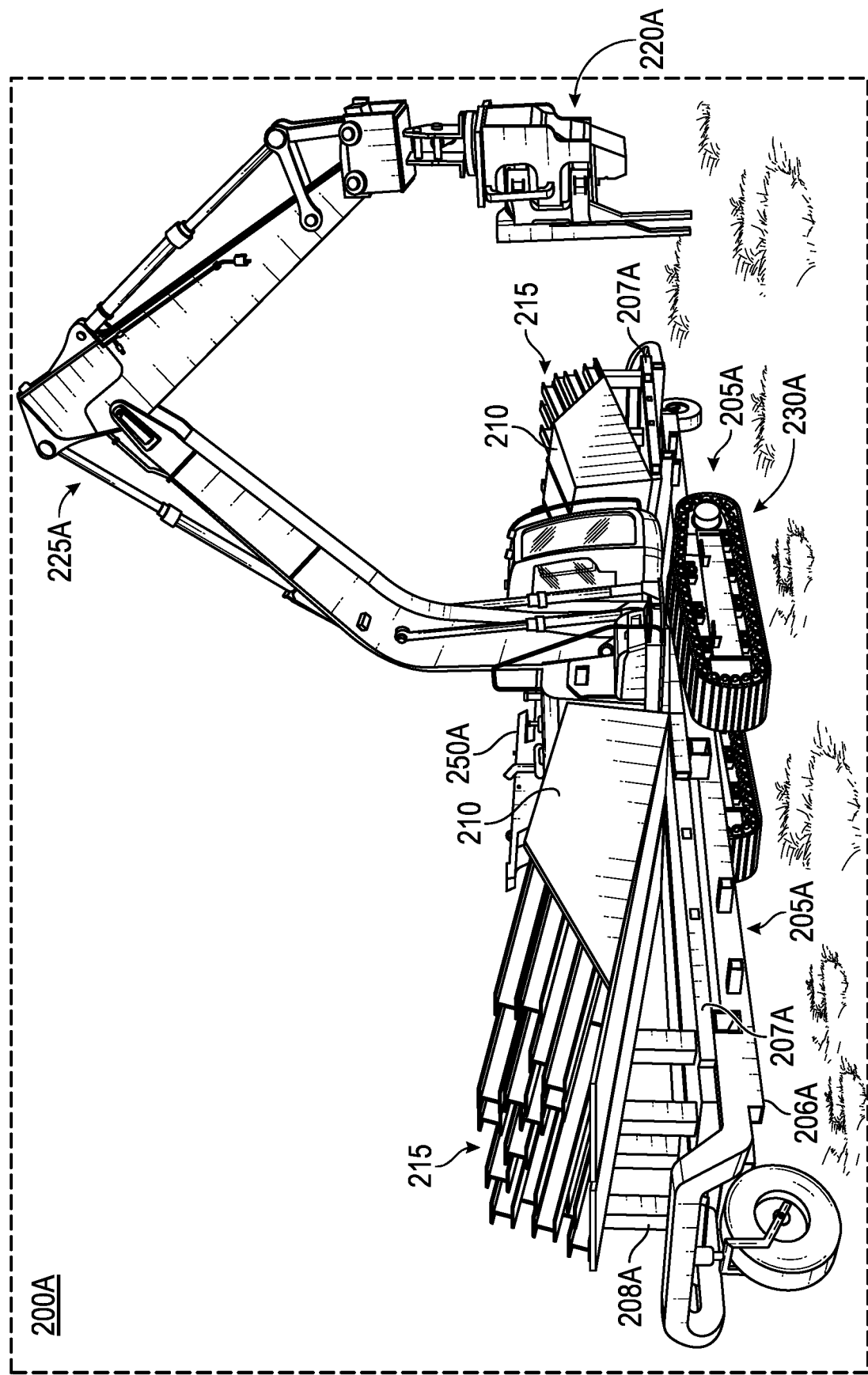
FIG. 2A shows a perspective view of one exemplary design of the AOV of FIG. 1, in accordance with some embodiments.
Figure 2B:
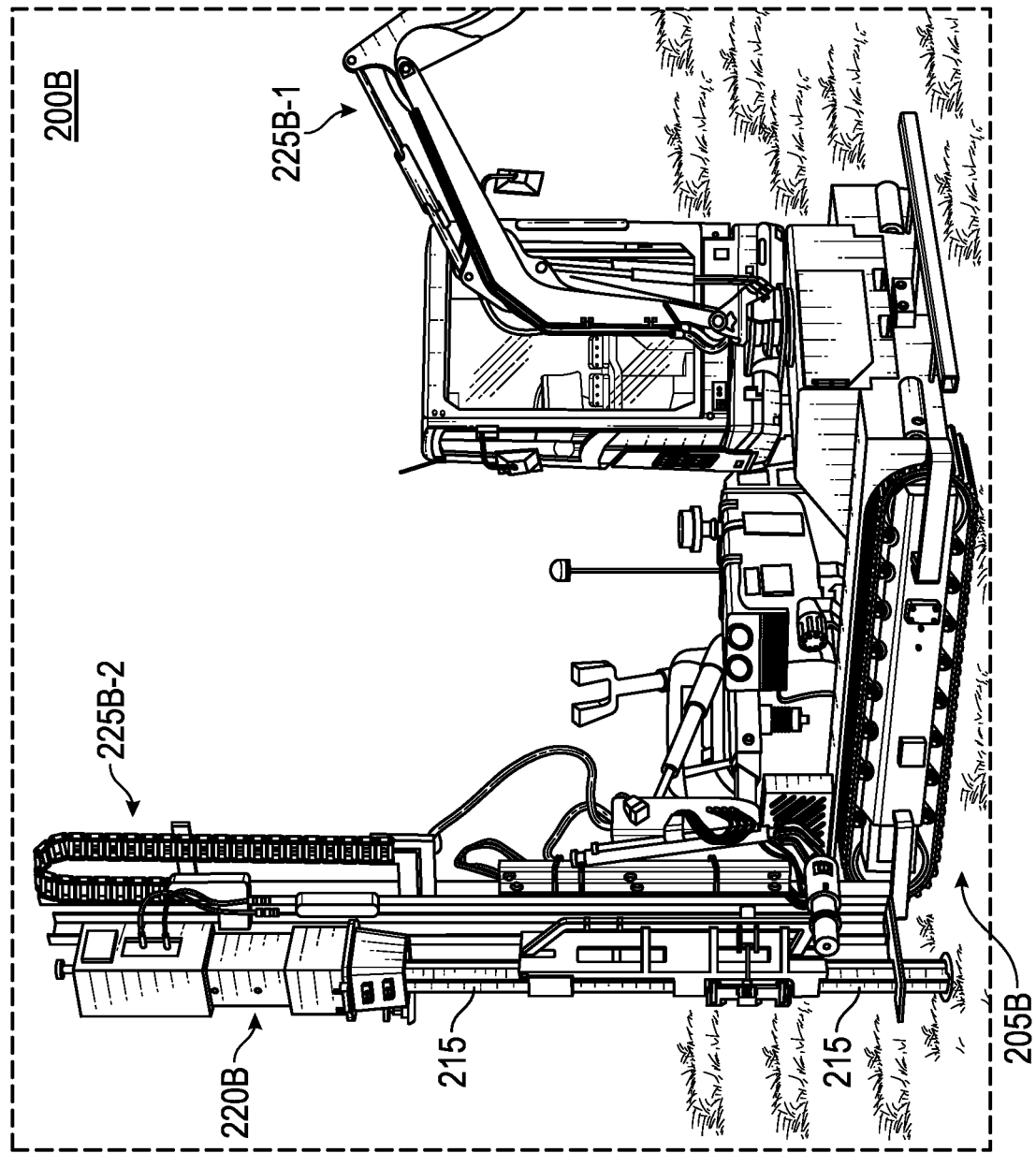
FIG. 2B shows a perspective view of another exemplary design of the AOV of FIG. 1, in accordance with some embodiments.

FIGS. 2A-2B show perspective views of exemplary designs of the AOV 110 of FIG. 1, in accordance with some embodiments. More specifically, FIG. 2A illustrates an exemplary design of a pile driving AOV 200A, and FIG. 2B illustrates another exemplary design of a pile driving AOV 200B. Both pile driving AOVs 200A-B shown in FIGS. 2A-2B are capable of performing at least the autonomous pile loading operation and the autonomous pile driving operation. The exemplary designs of the pile driving AOVs 200A-B shown in FIGS. 2A-2B are for ease of illustration and explanation only and not intended to be limiting. Any suitable design for the AOV 110 is encompassed within the scope of this disclosure so long as the design can perform one or more of the functions or operations described herein.

The pile driving AOV 200A of FIG. 2A illustrates an excavator-based design for an autonomous pile driving apparatus. As shown in FIG. 2A, the pile driving AOV 200A may include a chassis 205A including a base frame 206A upon which all other components are physically mounted. A carriage 207A mounted to the base frame 206A may include supporting members 208A on which one or more baskets 210 (e.g., pile set holders, cartridges, and the like) may be removably loaded. The embodiment shown in FIG. 2A shows the carriage 207A as being supported by wheels (not labeled in FIG. 2A). In other embodiments, the carriage 207A may be mounted to the AOV 200A without any wheels. Each basket 210 is adapted to hold a plurality of piles 215 that are driven by the pile driving AOV 200A into the ground using a driving tool 220A. More specifically, during the autonomous pile loading operation, the pile driving AOV 200A may actuate (e.g., using hydraulics, pneumatics, electric motors, etc.) articulated arm 225A of the driving tool 220A to adjust position and orientation of the driving tool 220A to load a pile 215 from a basket 210 onto the driving tool 220A, and lift and position the pile 215 loaded onto the driving tool 220A at a predetermined location above the ground where the pile is to be driven. After driving the pile 215 at the location, the pile driving AOV 200A may autonomously navigate to a next location dictated by a pile plan map and repeat the autonomous pile loading operation and the autonomous pile driving operation for a next pile 215 from the (same or different) basket 210.

The pile driving AOV 200A may also include a drive system 230A to impart mobility to the AOV 220A through a worksite. Although not specifically labeled in FIG. 2A, the pile driving AOV 200A may also include a power source that powers the drive system 230A, as well as components mounted on the AOV 200A such as the articulated arm 225A, and the driving tool 220A. The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In many pile driving AOVs, the power source powers the drive system 230A and the driving tool 220A commonly through a single hydraulic system, however other means of actuation may also be used. A common property of hydraulic systems used within pile driving AOVs is that the hydraulic capacity of the vehicle is shared between the drive system 230A and the driving tool 220A. In some embodiments, the instructions and control logic for the pile driving AOV 200A to operate autonomously and semi-autonomously includes instructions relating to determinations about how and under what circumstances to allocate the hydraulic capacity of the hydraulic system.

The pile driving AOV 200A may also include a sensor assembly 250A. For example, the sensor assembly 250A can include cameras (e.g., camera array) that capture image data, a location sensor (e.g., GPS receiver, Bluetooth sensor), a LIDAR system, a RADAR system, depth sensors, proximity detectors, or any other component. The sensor assembly 250A may thus be configured to detect one or more of image data, location data (e.g., geolocation data) indicating a location of the AOV 200A (or a location where a pile is being driven into the ground by the driving tool 220A) on a map corresponding to the geographic area, a presence of objects or things within a proximity of the AOV 200A, dimensions of any detected objects or things, and the like. Although not shown in FIG. 2A, the sensors of the sensor assembly 250A can be mounted on an external surface or appendage of the AOV 200A, can be located within the AOV 200A, can be coupled to an object or surface external to the AOV 200A, or can be mounted to a different vehicle. In some configurations, the AOV 220A may additionally include a communication apparatus, which functions to communicate (e.g., send and/or receive) data between the AOV 200A and a set of remote devices (e.g., central server 130 of FIG. 1). The communication apparatus can be a Wi-Fi communication system, a cellular communication system, a short-range communication system (e.g., Bluetooth, NFC, etc.), or any other suitable communication system.

The pile driving AOV 200B of FIG. 2B illustrates a custom-built design for an autonomous pile driving apparatus. As shown in FIG. 2B, the pile driving AOV 200B may include a chassis 205B including a base frame upon which all other components are physically mounted. Instead of including a carriage for loading baskets of piles 215, the system of the pile driving AOV 200B may utilize a separate pile distribution AOV (not shown) that carries the piles (or baskets of piles) 215. The pile driving AOV 200B may load a pile 215 from the separate pile distribution AOV by operating a pile loading mechanism 225B-1 and drive the pile 215 into the ground by operating a pile driving mechanism 225B-2. For example, during pile driving the separate pile distribution AOV may be parked adjacent the pile driving AOV 200B. The pile driving AOV 200B may perform the autonomous pile loading operation by actuating (e.g., using hydraulics, pneumatics, electric motors, etc.) the pile loading mechanism 225B-1 to adjust position and orientation of a loading tool to load a pile 215 from the separate pile distribution AOV onto the pile driving mechanism 225B-2. The pile driving AOV 200B may then perform the autonomous pile driving operation by actuating (e.g., using hydraulics, pneumatics, electric motors, etc.) the pile driving mechanism 225B-2 to adjust position and orientation of a driving tool 220B of the pile driving mechanism 225B-2 to drive the loaded pile 215 into the ground at a predetermined location where the pile is to be driven. After driving the pile 215 at the location, the pile driving AOV 200B may autonomously navigate to a next location dictated by the pile plan map and repeat the autonomous pile loading operation and the autonomous pile driving operation for a next pile 215 from the separate pile distribution AOV. Similar to the pile driving AOV 200A, the pile driving AOV 200B may also include a drive system, a power source, a sensor assembly, a communication apparatus, and the like. These components are not shown in FIG. 2B, and their detailed description is omitted here for simplicity.

Example Pile Driving AOV Configuration

Figure 3A:
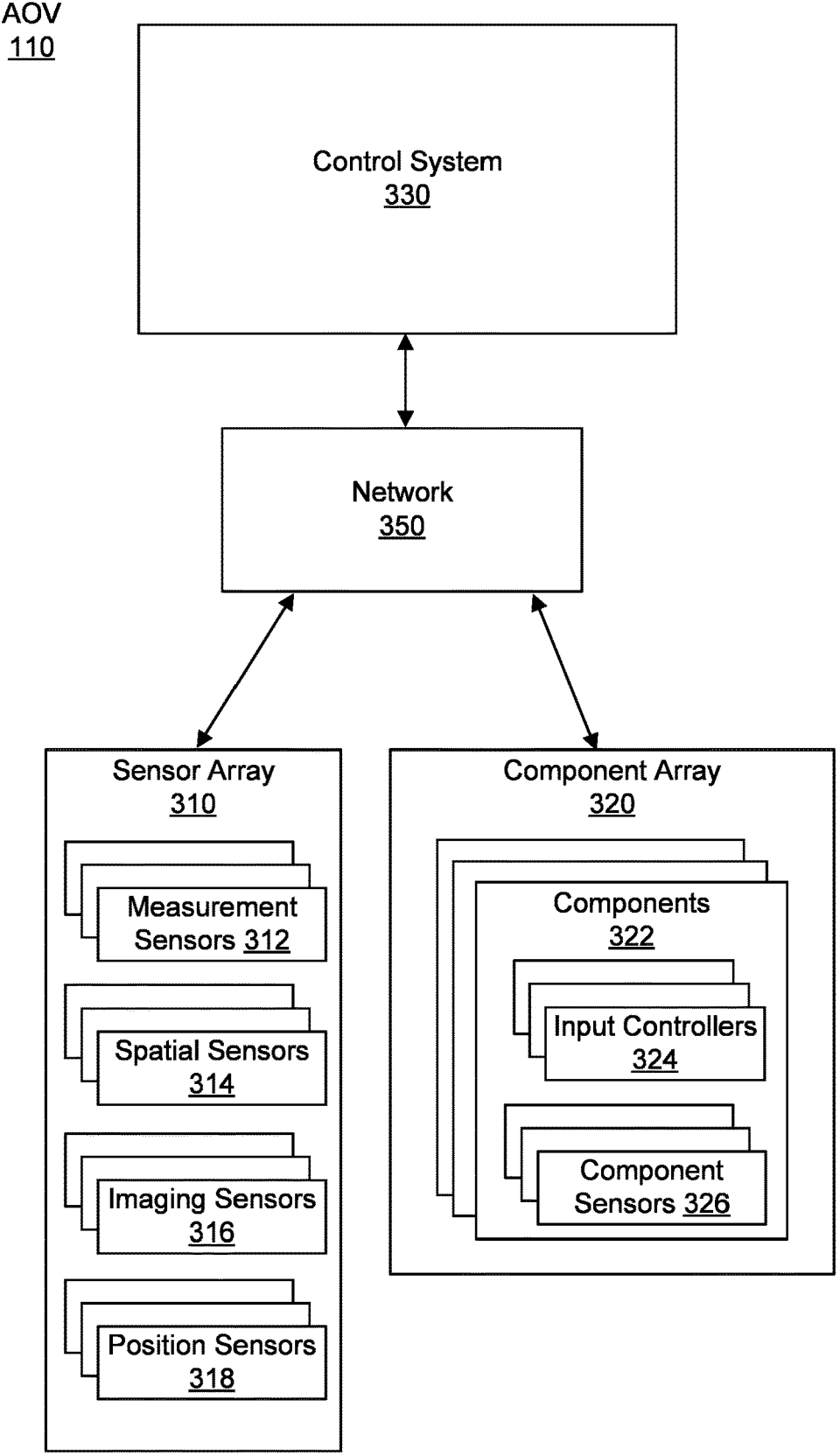
FIG. 3A is a block diagram of the AOV of FIG. 1, in accordance with some embodiments.

FIG. 3A is a block diagram of the AOV 110 of FIG. 1, in accordance with some embodiments. As shown in FIG. 3A, the AOV 110 includes a sensor array 310, a component array 320, and a control system 330, each communicatively coupled via a network 350. It should be noted that in other embodiments, the AOV 110 may include different, fewer, or additional components than those illustrated in FIG. 3.

The sensor array 310 includes a combination of one or more of: measurement sensors 312, spatial sensors 314, imaging sensors 316, and position sensors 318. The sensor array 310 is configured to collect data related to the AOV 110 and environmental data surrounding the AOV 110. The control system 330 is configured to receive the data from the AOV 110 and carry out instructions based on the received data to perform various autonomous operations (e.g., path planning operation, navigation operation, pile basket assembly operation, pile basket loading operation, pile basket distribution operation, pile distribution operation, pile loading operation, pile driving operation, obstacle map creation operation, quality control operation, pile removal operation, etc.). Each sensor is either removably mounted to the AOV 110 without impeding the operation of the AOV 110 or is an integrated component that is a native part of the AOV 110 as made available by its manufacturer. Each sensor transmits the data in real-time or as soon as a network connection is achieved, automatically without input from the AOV 110 or a human operator. Data recorded by the sensor array 310 is used by the control system 330 and/or the central server 130 of FIG. 1 to perform the various autonomous operations.

Measurement sensors 312 generally measure properties of the ambient environment, or properties of the AOV 110 itself. These properties may include tool position/orientation, relative articulation of the various joints of the arm supporting the tool, vehicle speed, ambient temperature, hydraulic pressure (either relative to capacity or absolute) including how much hydraulic capacity is being used by the drive system and the driving tool separately. A variety of possible measurement sensors 312 may be used, including hydraulic pressure sensors, linear encoders, radial encoders, inertial measurement unit sensors, incline sensors, accelerometers, strain gauges, gyroscopes, and string encoders.

The spatial sensors 314 output a three-dimensional map in the form of a three-dimensional point cloud representing distances, for example between one meter and fifty meters between the spatial sensors 314 and the ground surface or any objects within the field of view of the spatial sensor 314, in some cases per rotation of the spatial sensor 314. In one embodiment, spatial sensors 314 include a set of light emitters (e.g., Infrared (IR)) configured to project structured light into a field near the AOV 110, a set of detectors (e.g., IR cameras), and a processor configured to transform data received by the infrared detectors into a point cloud representation of the three-dimensional volume captured by the detectors as measured by structured light reflected by the environment. In one embodiment, the spatial sensor 314 is a LIDAR sensor having a scan cycle that sweeps through an angular range capturing some or all of the volume of space surrounding the AOV 110. Other types of spatial sensors 314 may be used, including time-of-flight sensors, ultrasonic sensors, and radar sensors.

Imaging sensors 316 capture still or moving-video representations of the ground surface, objects, and environment surrounding the AOV 110. Example imaging sensors 316 include, but are not limited to, stereo RGB cameras, structure from motion cameras, and monocular RGB cameras. In one embodiment, each camera can output a video feed containing a sequence of digital photographic images at a rate of 20 Hz. In one embodiment, multiple imaging sensors 316 are mounted such that each imaging sensor captures some portion of the entire 360-degree angular range around the vehicle. For example, front, rear, left lateral, and right lateral imaging sensors may be mounted to capture the entire angular range around the AOV 110.

The position sensors 318 provide a position of the AOV 110. This may be a localized position within a geographic area, or a global position with respect to latitude/longitude, or some other external reference system. In one embodiment, a position sensor is a global positioning system interfacing with a static local ground-based GPS node mounted to the AOV 110 to output a position of the AOV 110.

There are a number of different ways for the sensor array 310 generally and the individual sensors specifically to be constructed and/or mounted to the AOV 110. This will also depend in part on the design or construction of the AOV 110. The number, location, type or mounting position of the sensors for the AOV 110 is not intended to be limiting, so long as the sensors can operate to enable the autonomous operations described.

Generally, individual sensors as well as the sensor array 310 itself range in complexity from simplistic measurement devices that output analog or electrical systems electrically coupled to a network bus or other communicative network, to more complicated devices which include their own onboard computer processors, memory, and the communications adapters. Regardless of construction, the sensors and/or sensor array together function to record, store, and report information to the control system 330. Any given sensor may record, or the sensor array may append to recorded data time stamps for when data was recorded.

The sensor array 310 may include its own network adapter (not shown) that communicates with the control system 330 either through either a wired or wireless connection. For wireless connections, the network adapter may be a Bluetooth Low Energy (BTLE) wireless transmitter, infrared, or 802.11 based connection. For wired connection, a wide variety of communications standards and related architecture may be used, including Ethernet, a Controller Area Network (CAN) Bus, or similar. In the case of a BTLE connection, after the sensor array 310 and the control system 330 have been paired with each other using a BLTE passkey, the sensor array 310 automatically synchronizes and communicates sensor data to the control system 330. If the sensor array 310 has not been paired with the control system 330 prior to operation, the information is stored locally until such a pairing occurs. Upon pairing, the sensor array 310 communicates any stored data to the control system 330.

The component array 320 includes one or more components 322. The components 322 are elements of the AOV 110 that can perform different actions. Non-limiting examples of the components 322 include the articulated arm 225A, the pile loading mechanism 225B-1, the pile driving mechanism 225B-2, the driving tools 220, the drive system 230A, as shown in FIGS. 2A-2B. Other examples of components 322 may include components for performing one or more of the various autonomous operations (e.g., path planning operation, navigation operation, pile basket assembly operation, pile basket loading operation, pile basket distribution operation, pile distribution operation, pile loading operation, pile driving operation, obstacle map creation operation, quality control operation, pile removal operation). As illustrated in FIG. 3, each component has one or more input controllers 324 and one or more component sensors 326, but a component may include only sensors or only input controllers. An input controller controls the function of the component. For example, an input controller may receive machine commands via the network and actuate the component in response. A component sensor 326 generates measurements within the system environment. The measurements may be of the component, the AOV 110, or the environment surrounding the AOV 110. For example, a component sensor 326 may measure a configuration or state of the component 322 (e.g., a setting, parameter, power load, etc.), or measure an area surrounding the AOV (e.g., moisture, temperature, etc.).

The control system 330 receives information from the sensor array 310 and the component array 320, and performs operations based on an input pile plan map. For example, the control system 330 controls one or more of the components 322 based on the pile plan map to autonomously assemble an ordered set of piles that may include piles of different types into a basket of piles and load the basket of piles onto a vehicle for distribution and/or driving into the ground. As another example, the control system 330 controls one or more of the components 322 based on the pile plan map to autonomously perform the pile loading operation and the pile driving operation at a first location, and autonomously navigate to a next location based on the pile plan map to autonomously perform the pile loading operation and the pile driving operation at the next location, and so on. As another example, the control system 330 controls one or more of the components 322 based on an obstacle map to autonomously navigate to a desired location or perform AOV tool path planning (e.g., movement of articulated arm to load a pile into the driving tool) based on the pile plan map and while avoiding obstacles. Operation and functionality of the control system 330 is described in greater detail in FIG. 3B.

The network 350 connects nodes of the AOV 110 to allow microcontrollers and devices to communicate with each other. In some embodiments, the components are connected within the network as a Controller Area Network (CAN). In this case, within the network each element has an input and output connection, and the network 350 can translate information between the various elements. For example, the network 350 receives input information from the sensor array 310 and the component array 320, processes the information, and transmits the information to the control system 330. The control system 330 generates instructions to execute different steps of the different autonomous operations based on the information and transmits the instructions to carry out the steps of the autonomous operations to the appropriate component(s) 322 of the component array 320. In other embodiments, the components may be connected in other types of network environments and include other networks, or a combination of network environments with several networks. For example, the components may be connected in a network such as the Internet, a LAN, a MAN, a WAN, a mobile wired or wireless network, a private network, a virtual private network, a direct communication line, and the like.

Figure 3B:
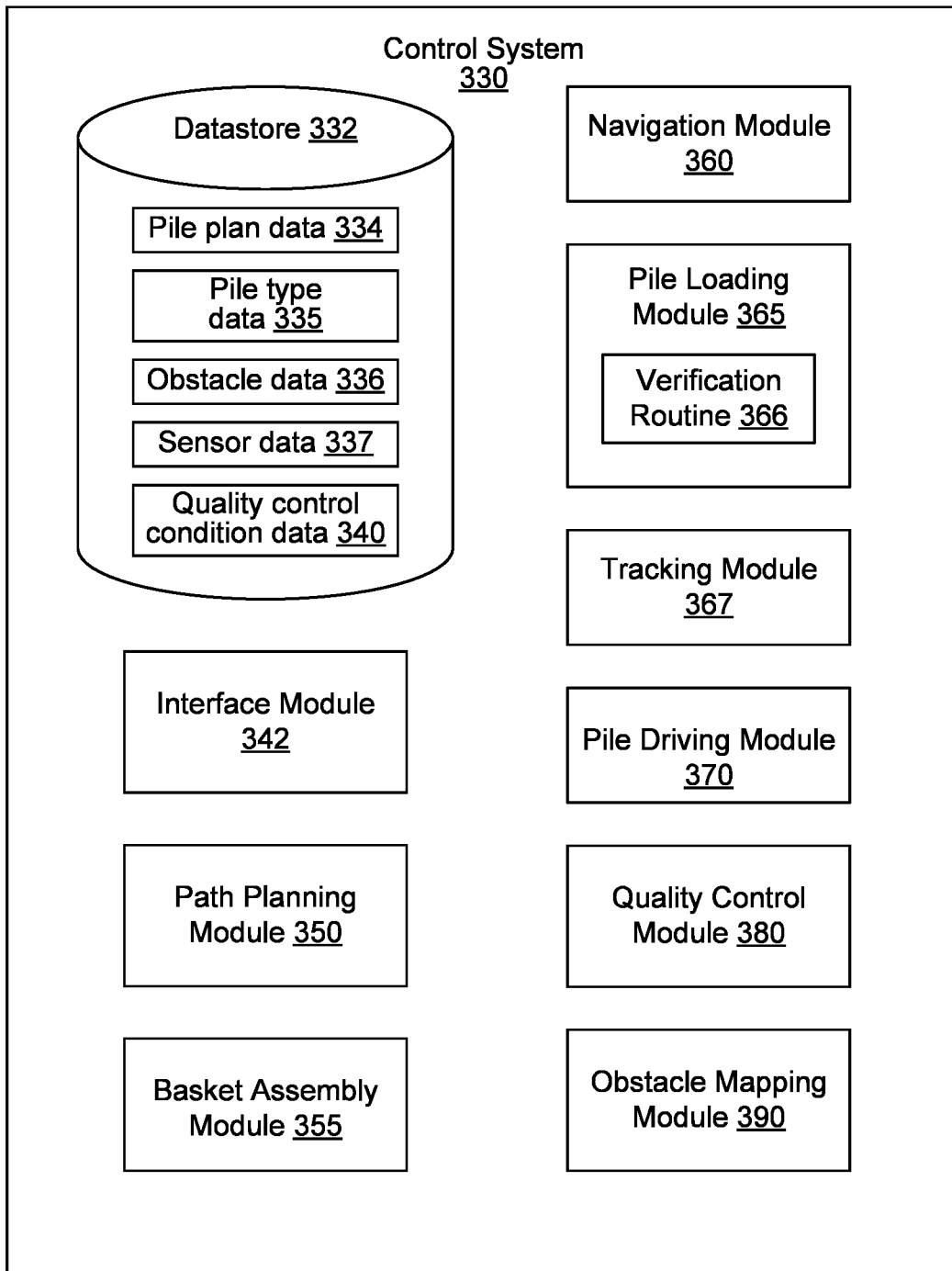
FIG. 3B is a block diagram of the control system of the AOV of FIG. 3A, in accordance with some embodiments.

FIG. 3B is a block diagram of the control system 330 of FIG. 3A, in accordance with some embodiments. Referring to FIG. 3B, the control system 330 includes a datastore 332, an interface module 342, a path planning module 350, a basket assembly module 355, a navigation module 360, a pile loading module 365, a tracking module 367, a pile driving module 370, a quality control module 380, and an obstacle mapping module 390. The datastore 332 may store different types of data utilized, generated, or received by the control system 330 for performing the different autonomous operations related to pile driving. For example, the datastore 332 may store pile plan data 334, pile type data 335, obstacle data 336, sensor data 337, and quality control condition data 340. The pile loading module 365 may include a verification routine 366. In different embodiments, the control system 330 may include fewer or additional components. The control system 330 may also include different components. Additionally, some of the data or functionality described in connection with the control system 330 may be subsumed by other components, such as the central server 130 of FIG. 1.

The interface module 342 is an interface for a user and/or a third-party software platform to interact with the control system 330. The interface module 342 may be a web application that is run by a web browser on a user device or a software as a service platform that is accessible by a user device through a network (e.g., network 160 of FIG. 1). In some embodiments, the interface module 342 may use application program interfaces (APIs) to communicate with user devices or third-party platform servers, which may include mechanisms such as webhooks.

Example Pile Plan Map

Figure 4:
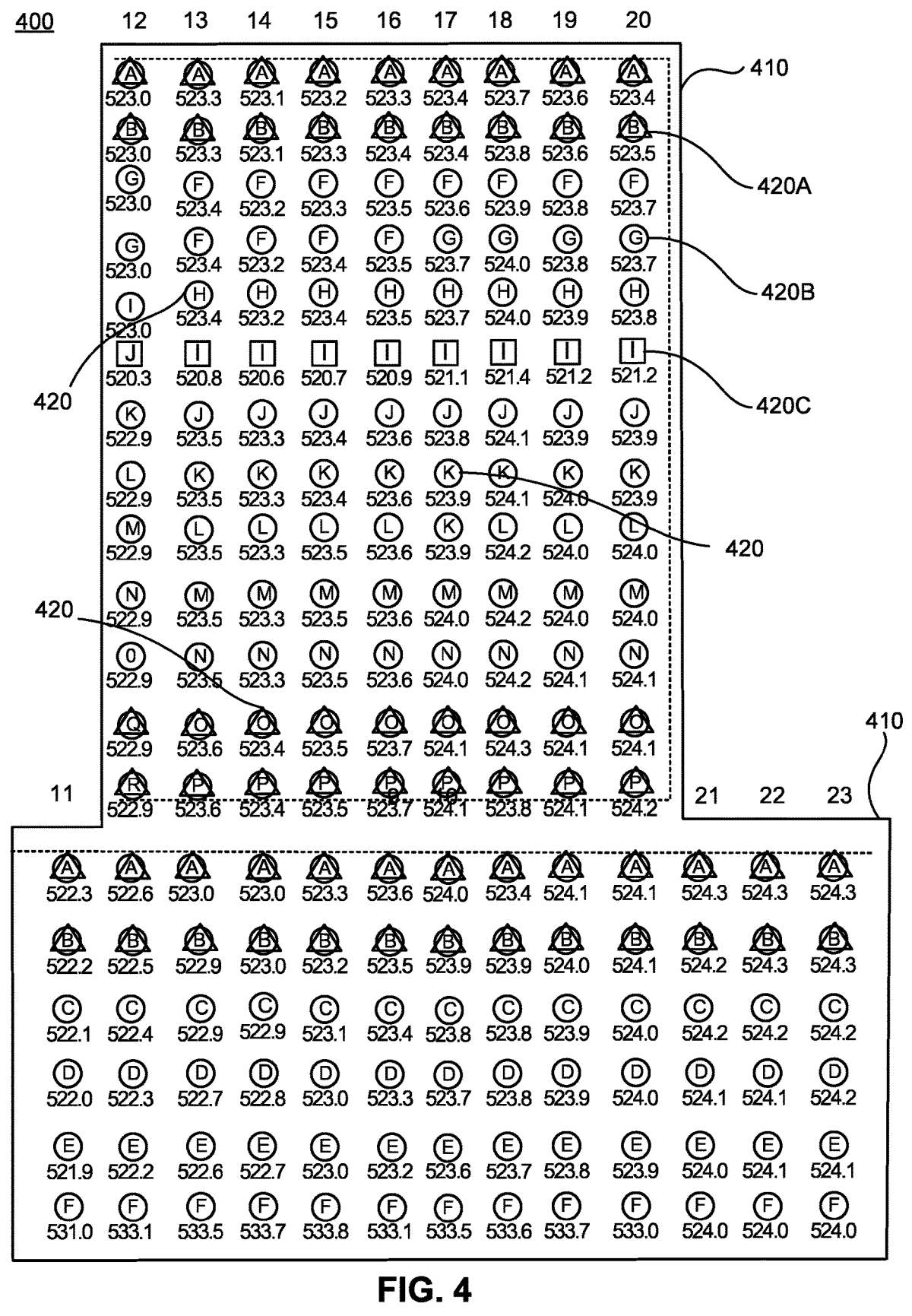

The control system 330 may be configured to perform the various autonomous operations related to pile driving based on the pile plan data 334 stored in the datastore 332. The pile plan data 334 may include data corresponding to the pile plan map. FIG. 4 illustrates an exemplary pile plan map 400, in accordance with some embodiments. The pile plan map 400 may include map data corresponding to a geographic area 410 where autonomous pile driving operations are to be performed by one or more of the AOVs 110. For example, the pile plan map 400 may be developed by a user (e.g., site engineer) using a software application for the geographic area 410 where a solar farm project is being developed and installed. The user may develop the pile plan map 400 based on, e.g., environmental conditions, ground conditions, customer requirements, budget, target installed solar power generation capacity, etc. As shown in FIG. 4, the pile plan map 400 may specify a plurality of locations 420 in the geographic area 410 in which the piles are intended to be driven and located.

For each location 420, the pile plan data 334 of the pile plan map 400 may include data of one or more pile parameters. For example, the pile parameter data may specify the exact or approximate geolocation (e.g., GPS location, latitude and longitude data) in the geographic area where the corresponding pile (or piles) is to be installed. As another example, the data may specify the type of pile to be installed at that location.

As yet another example, the pile parameter data may specify an install pattern detailing the number and/or type of piles to be installed at a given location. For example, in hard ground conditions (e.g., rock surface) the install pattern may specify parameters of a pre-drilling step that is to be performed at the given location. The pre-drilling step may be performed by a separate specialized drilling AOV or may be performed manually. In embodiments where the pre-drilling is performed autonomously, the pile parameter data may specify the actuation parameters for the drilling AOV to perform the pre-drilling at the given location (e.g., location, depth/dimensions of hole to be drilled). In addition, the pile parameter data may specify the intended state of the pile at the given location after the installation. For example, the intended state may specify the orientation, the plumbness or verticality, the height of the pile, reveal height of the pile, and the like. As yet another example, the pile parameter data may specify one or more tolerance thresholds for one or more of the pile parameters. For example, the pile parameter data may specify a given target height of the pile and the corresponding tolerance threshold may specify a range within which the actual installed height of the pile should fall after the pile driving operation is complete (e.g., tolerance threshold of +0.2 inches of the minimum reveal height). As another example, the pile parameter data may specify a target verticality (e.g., 90 degrees) of the pile relative to a horizontal plane and the corresponding tolerance threshold may specify a range within which the actual plumbness of the pile should fall after the pile driving operation is complete (e.g., ±10% of the target plumbness).

In FIG. 4, the different shapes (e.g., circle, square, triangle plus circle) may convey the different pile parameters for each location. For example, the pile parameter data for location 420A of the pile plan map 400 of FIG. 4 may convey that both a pre-drilling step is to be performed and a pile of a first type (e.g., H-pile Type 1 having a particular length) is to be driven into the ground at the location 420A (having, e.g., a first reveal height and a first plumbness). As another example, the pile parameter data for location 420B may convey that a second type of pile (e.g., I-pile having a particular bolt hole pattern) is to be driven into the ground at that location 420B (having, e.g., a second reveal height and a second plumbness). And as yet another example, the pile parameter data for location 420C may convey that a third type of pile is to be driven into the ground at location 420C (having, e.g., a third reveal height and a third plumbness).

Example Path Planning

The pile plan data 334 corresponding to the pile plan map 400 may be accessed by the control system 330 to perform various operations. For example, based on the pile plan data 334, the path planning module 350 of FIG. 3B may perform a path planning operation of setting a path plan for one or more AOVs to drive a plurality of piles at respective locations 420 and consistent with the corresponding pile parameter data. The path planning operation may entail determining and setting one or more path plans for one or more AOVs 110 to cover the entire area defined by, e.g., the geographic area 410 of FIG. 4, to drive piles at each respective locations 420 while optimizing for various factors (e.g., cost, efficiency, time, etc.). Based on the set path plan, a given AOV 110 may traverse the entire geographic area 410 or a portion thereof to perform various operations related to pile driving (e.g., autonomous pile loading operation, autonomous pile driving operation, quality control operation, obstacle map creation operation). For example, the path plan may be executed by one or more AOVs 110 by autonomously navigating over one or more linear columns and stopping at each location 420 in each column to autonomously drive piles, so as to cover the entire geographic area 410 while minimizing at least one of a total drive time, a total number of turns, and the like.

Example Basket Assembly Operations

One of the autonomous operations that may be performed by the control system 330 by accessing the pile plan data 334 corresponding to the pile plan map 400 may be a basket assembly operation. For example, the basket assembly module 355 may take the pile plan data 334 as input and generate instructions prescribing a breakdown of basket quantity and composition for each basket. Configuration and functionality of the basket assembly module 355 is described below in connection with FIG. 5.

Figure 5:
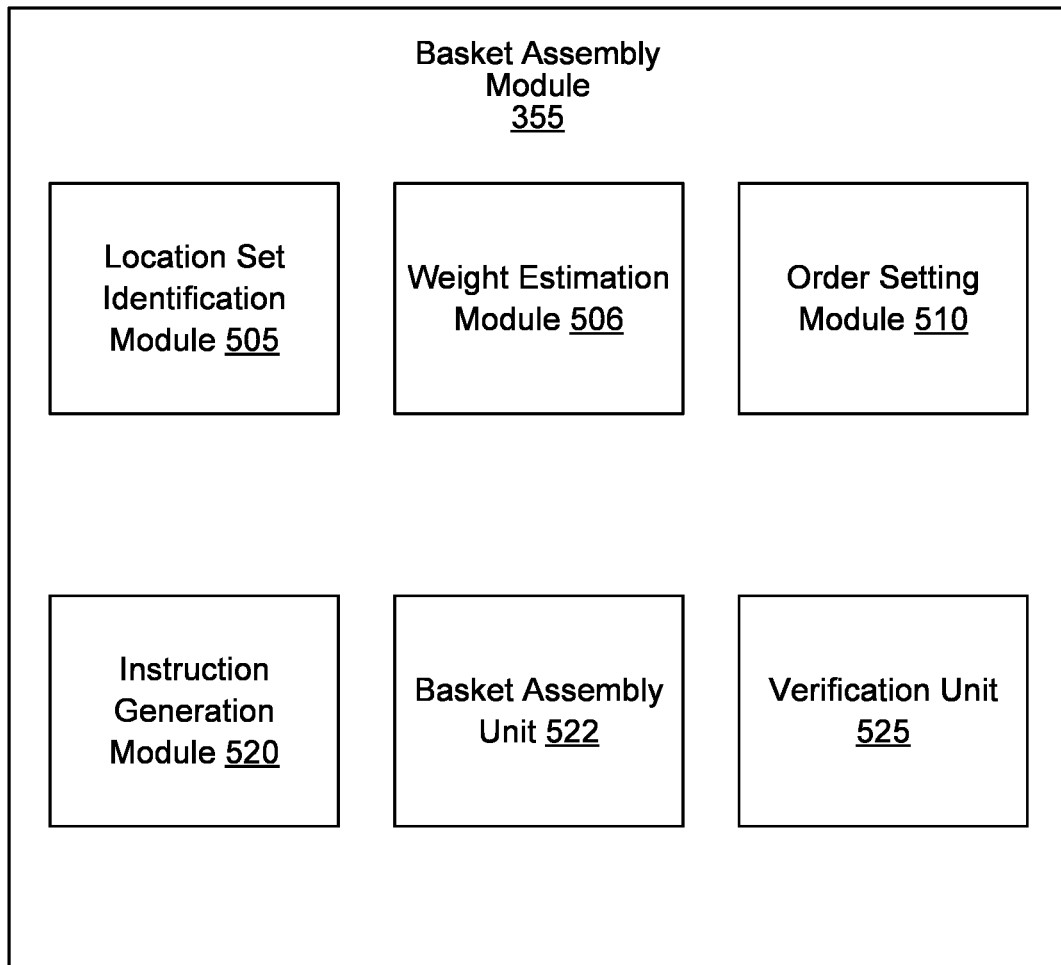
FIG. 5 is a block diagram of the basket assembly module of the control system of FIG. 3B, in accordance with some embodiments.

As shown in FIG. 5, the basket assembly module 355 may include a location set identification module 505, a weight estimation module 506, an order setting module 510, an instruction generation module 520, a basket assembly unit 522, and a verification unit 525. In different embodiments, the basket assembly module 355 of FIG. 5 may include fewer or additional components. The basket assembly module 355 may also include different components.

The location set identification module 505 may take the pile plan data 334 as input and identify, on a per-basket-basis, a set of locations (e.g., locations A-F of column 11 of FIG. 4) from among the plurality of locations (e.g., all locations 420 in FIG. 4 within geographic area 410) of the pile plan map, and further identify the pile parameter data corresponding to the piles (e.g., pile type data) to be respectively driven into the ground at each of the identified set of locations.

For example, the location set identification module 505 may access the path plan for the AOV 110 generated by the path planning module 350 and/or the pile plan data 334 and determine a number of baskets of piles required to complete the pile driving operations per the pile driving order dictated by the path plan for the AOV 110. The number of baskets may be determined based on, e.g., information regarding a maximum number of piles that can be held in each basket. Further, for each of the prescribed number of baskets, the location set identification module 505 may identify the set of locations whose piles will be loaded or stored in that basket. In determining for each basket, the set of locations whose piles will be loaded in the basket, the location set identification module 505 may utilize weight estimates generated by the weight estimation module 506. For a given basket, based on the corresponding set of locations determined by the location set identification module 505, the number of piles to be loaded into the basket may be less than a maximum number of piles that the basket can hold, e.g., based on the total basket weight, or based on the remaining number of pile driving locations.

For each prescribed basket, the weight estimation module 506 may be configured to estimate a total weight of the basket based on the set of locations and corresponding pile parameters included in the pile plan data 334. For example, the datastore 332 of FIG. 3B may include pile type data 335 that includes information regarding each type of pile. For example, the information may include dimensions of the type of pile, weight of the type of pile, and the like. Based on the pile type data 335 and based on the identified set of locations for the basket, the weight estimation module 506 may estimate the weight of the basket. Further, based on the estimated weight, the location set identification module 505 may determine whether any modifications should be made to the identified set of locations corresponding to the basket. For example, the location set identification module 505 may determine whether the estimated weight is higher than a threshold and/or determine whether a weight distribution between the piles (that may have different weights and/or dimensions) that are to be loaded within the same basket in a particular order is within a threshold tolerance. Based on the determination, the location set identification module 505 may modify/adjust the set of locations associated with the basket. For example, the location set identification module 505 may reduce the number of locations associated with the basket to reduce the total weight of the basket and/or to adjust the weight distribution of the piles assigned to the same basket.

Further, based on the estimated total weights of each of the prescribed number of baskets, the location set identification module 505 may also perform similar determination regarding whether a weight distribution between multiple baskets (which may all be loaded onto a same pile distribution vehicle or pile driving AOV) is within a threshold tolerance. Based on this determination, the location set identification module 505 may also similarly modify the set of locations (and corresponding assembled piles) associated with one or more of the prescribed baskets.

After the set of locations for a given basket has been identified by the location set identification module 505, the order setting module 510 may identify the pile driving order of the piles corresponding to the set of locations per the pile plan data 334. For example, in case of the set of locations being the locations A-F of column 11 of FIG. 4, the order setting module 510 may identify the type of pile to be driven at each of the locations A-F, and further determine the order in which (e.g., based on the path plan) the pile driving operation is to be performed for the set of locations (e.g., A, then B, then C, . . . , then F).

The instruction generation module 520 may generate basket assembly (e.g., kitting) instructions for each prescribed basket based on the pile type and pile order identified by the order setting module 510. The basket assembly instructions may be for assembling or kitting a set of piles into a basket based on the pile type and the pile order identified by the order setting module 510. Continuing with the above example of locations A-F of column 11 of FIG. 4, since the piles are to be driven in the order of A, B, C, . . . , F, the basket assembly instructions generated by the instruction generation module 520 may dictate basket assembly in, e.g., a reverse order (i.e., F, E, . . . A) such that the piles of the corresponding pile types become accessible during pile driving operations in the order of A, B, C, . . . , F. For example, if the basket stores the piles as a stack of piles, the assembly is performed such that the top pile in the stack is of a pile type that is to be driven at location A, the second from the top pile in the stack is of a pile type that is to be driven at location B, and so on.

The basket assembly unit 522 may be configured to assemble an ordered set of piles into a basket based on the basket assembly instructions generated by the instruction generation module 520. For example, the basket assembly unit 522 may be configured to transmit the basket assembly instructions to a third-party vendor for manual assembly of baskets of piles based on the corresponding pile driving order and pile types specified by the corresponding basket assembly instructions for each basket. The third-party vendor may receive the instructions and assemble the piles of the different types in the specified order into the prescribed baskets and deliver the assembled baskets ready for use for autonomous pile driving per the pile plan map.

As another example, the basket assembly unit 522 may control an autonomous basket assembly robot or AOV that is adapted to accept the basket assembly instructions as input and autonomously navigate or operate in a pile storage area where piles of different types are stored in respective silos, bins, or sections and assemble an ordered set of piles having respective pile types into the baskets based on the basket assembly instructions. The pile basket assembly operation may thus be performed fully autonomously based on an input pile plan map.

The verification unit 525 may be configured to perform a verification operation of verifying that an access order of the set of piles in the assembled basket assembled under control of the basket assembly unit 522 matches the order for driving the set of piles into the ground as identified by the order setting module 510. In some embodiments, the verification unit 525 may utilize one or more sensors (e.g., of sensor array 310 of the AOV 110) to obtain sensor data (e.g., image data) of the basket of piles assembled under control of the basket assembly unit 522, to perform the verification operation. In other embodiments, the verification unit 525 may operate in a semi-autonomous mode where the unit takes human input in order to complete the verification process.

For example, piles may be color-coded based on pile type, and by obtaining image data of the color-coded piles assembled as an ordered set of piles in the basket, the verification unit 525 may apply known image processing techniques to determine the access order of piles of different pile types in the assembled basket and determine whether or not a comparison of the access order determined by the verification unit 525 and the pile driving order identified by the order setting module 510 reveals a match. The verification unit 525 may perform predetermined actions based on the comparison. For example, in response to detecting a mismatch between the access order and the pile driving order, the verification unit 525 may flag the basket for re-assembly, notify an operator for manual intervention, and the like.

Example Autonomous Operations Related to Pile Driving

Returning to FIG. 3B, other autonomous operations that may be performed by the control system 330 based on the pile plan data 334 may include operations related to pile driving such as the navigation operation, the pile basket loading operation, the pile distribution operation, the pile loading operation, and the pile driving operation.

In some embodiments, the navigation module 360 may take the path plan generated by the path planning module 350 as input and perform the autonomous navigation operation. The autonomous navigation operation may entail the AOV 110 (e.g., pile driving AOV, pile loading AOV, pile distribution AOV, etc.) autonomously navigating within the geographic area from one location to another. For instance, the navigation module 360 can, in response to identifying a task or function to be performed by the AOV 110 (e.g., drive a pile into the ground), identify a location associated with the identified task or function (e.g., based on the pile plan data 334), and can select a route from a current location of the AOV 110 to the identified location, and autonomously navigate along the selected route in the geographic area.

For example, based on the order in which the piles are to be driven into the ground by a given AOV 110 (as dictated by the path plan), the navigation module 360 may select a first location that corresponds to a next location based on the path plan and controls one or more components of the AOV 110 (e.g., components 322) to autonomously navigate the AOV 110 from its current location to the first location. After completion of pile driving operations at the first location, the navigation module 360 may select a second location that corresponds to a next location based on the path plan and controls one or more components of the AOV 110 (e.g., components 322) to autonomously navigate the AOV 110 from its current location to the second location, and so on. The route selection by the autonomous navigation module 360 may be so that obstacles detected (e.g., in real-time) by the AOV 110 using sensor data from sensors (e.g., of the sensor array 310) and/or based on the obstacle data 336 including an obstacle map generated (and updated in real-time) by the obstacle mapping module 380, are avoided.

The pile loading module 365 may be configured to control one or more components (e.g., components 322) of an AOV 110 to autonomously load a pile onto a driving tool of an AOV 110. In some embodiments, the AOV 110 that loads the pile onto the driving tool and the AOV 110 that actuates the driving tool to drive the pile into the ground may be the same. In other embodiments, the AOV 110 that loads the pile onto the driving tool and the AOV 110 that actuates the driving tool to drive the pile into the ground may be separate autonomous AOVs 110.

In some embodiments, as explained previously in connection with the basket assembly operation, piles having pile types corresponding to the driving order per the path plan may be assembled as an ordered set into a basket of piles. Further, the AOV 110 may be loaded with multiple baskets of the ordered sets of piles. In this case, the pile loading module 365 may be configured to automatically identify one of the baskets of piles as corresponding to the current location and further automatically identify a position of one of the piles (e.g., the pile on the top of the stack of piles in the identified basket) in the identified basket as the pile having the correct pile type for the current location. The pile loading module 365 may then autonomously actuate one or more components of the AOV 110 to pick up the identified pile from the identified basket and load the pile onto a driving tool of the AOV.

Continuing with the above example, at the first location that corresponds to the next location based on the path plan, the pile loading module 365 autonomously actuates one or more components of the AOV to load the identified pile from the identified basket of piles (e.g., top pile in the identified basket storing the ordered set of piles). After completion of pile driving operations at the first location and autonomous navigation of the AOV to the second location, the pile loading module 365 may autonomously actuate one or more components of the AOV to load a next identified pile from the identified basket of piles that corresponds to the second location, and so on.

In some embodiments, the pile loading module 365 may also include a verification routine 366 to confirm accuracy of the pile being picked up and loaded onto the driving tool for driving. For example, piles may be color-coded or may be associated with a unique code (e.g., scannable QR code, RFID tag, bar-code, etc.) based on pile type, and by obtaining image data or other sensor data of the pile before or after it is picked up for loading and applying known techniques (and based on the pile type data 335 and the pile plan data 334), the verification routine 366 may verify whether the picked-up pile has a pile type that matches that pile type for the current pile driving location. The verification routine 366 may perform predetermined actions based on the verification. For example, in case of a mismatch, the pile loading module 365 may stop the pile loading operation and notify an operator.

In some embodiments, instead of performing the basket assembly operation, piles of different types may be arranged in respective baskets or otherwise arranged on a pile distribution AOV (or on a carriage of a pile driving AOV) such that a pile of each type remains always accessible to the components actuatable by the pile loading module 365 for pick up and loading. In this case, the pile loading module 365 may be configured to take as input the pile plan data 334, determine the pile type for the current location, and autonomously actuate one or more components of the AOV to pick up and load a pile onto the driving tool from one of the respective baskets, bins, or regions based on the pile type for the current location. At the next location where the AOV is autonomously navigated to, the pile loading module 365 may again repeat the operations to determine the pile type for the next location based on the pile plan data 334 and autonomously actuate one or more components of the AOV to pick up and load the pile of the determined pile type for a corresponding one of the baskets or regions.

The control system 330 may further include a tracking module 367 to track for each pile type, a number of remaining piles of the type on the carriage of the pile driving AOV or other vehicle acting as the pile distribution AOV. Based on the tracking data from the tracking module 367, the navigation module 360 may control to modify the autonomous navigation operation. For example, when selecting, based on the path plan, the next location for autonomous navigation, pile loading, and pile driving, the navigation module 360 may utilize the pile tracking data from the tracking module 367 to determine whether a pile of the type needed for driving at the next location is available to the AOV 110. If the pile of the type is available, the navigation module 360 may actuate the one or more components to navigate to the next location as described previously. If, on the other hand, the pile of the type is determined not to be available, the navigation module 360 may skip the next location per the path plan and select a subsequent location per the path plan and repeat the determination process to determine whether a pile of the type needed for driving at the subsequent location is available. The navigation module 360 may repeat the process until the remaining piles available to the AOV are all driven into the ground at appropriate locations, while skipping locations for which appropriate piles are not available currently to the AOV. And in this case, the navigation module 360 may also update one or more of the pile plan data 334 or the path plan to track the skipped locations where pile driving remains outstanding.

In some embodiments, piles of the correct pile type may be pre-distributed at the respective locations by a pile distribution AOV conducting a pile distribution operation. For example, a pile (of the correct type) may be pre-placed on the ground at or proximal to a location where the pile is to be driven, and the pile loading module 365 may autonomously actuate one or more components to pick up the pile from the ground at the location and load the pile onto the driving tool of the AOV for driving.

The pile driving module 370 may be configured to control one or more components of an AOV 110 (e.g., components 322) to autonomously drive the pile loaded by the pile loading module 365 into the ground at the location selected by the navigation module 360. Continuing with the above example, at the first location that corresponds to the next location based on the path plan, the pile driving module 370 autonomously actuates one or more components of the AOV to drive the loaded pile into the ground at the first location selected by the navigation module 360. After completion of pile driving operation at the first location and autonomous navigation of the AOV to the second location, the pile driving module 370 may autonomously actuate one or more components of the AOV to drive the next pile loaded by the pile loading module 365 into the ground at the second location selected by the navigation module 360, and so on. During the pile driving operation, the pile driving module 370 may continuously monitor the (co-occurring) sensor data 337 from one or more sensors (e.g., sensors of sensor array 310, component sensors 326, and the like) to determine when the pile driving operation is completed. For example, the pile parameters may dictate a predetermined reveal height (e.g., how high the pile protrudes from the surface of the ground) for the pile, and the pile driving module 370, while driving the pile into the ground, may monitor the time-series sensor data to continuously measure the reveal height, and stop the pile driving operation when the reveal height reaches the intended reveal height per the pile parameters. The basket loading operation, autonomous navigation operation, the pile loading operation, and the pile driving operation are depicted and described in further detail below in connection with FIGS. 6A-6C.

Figure 6A:
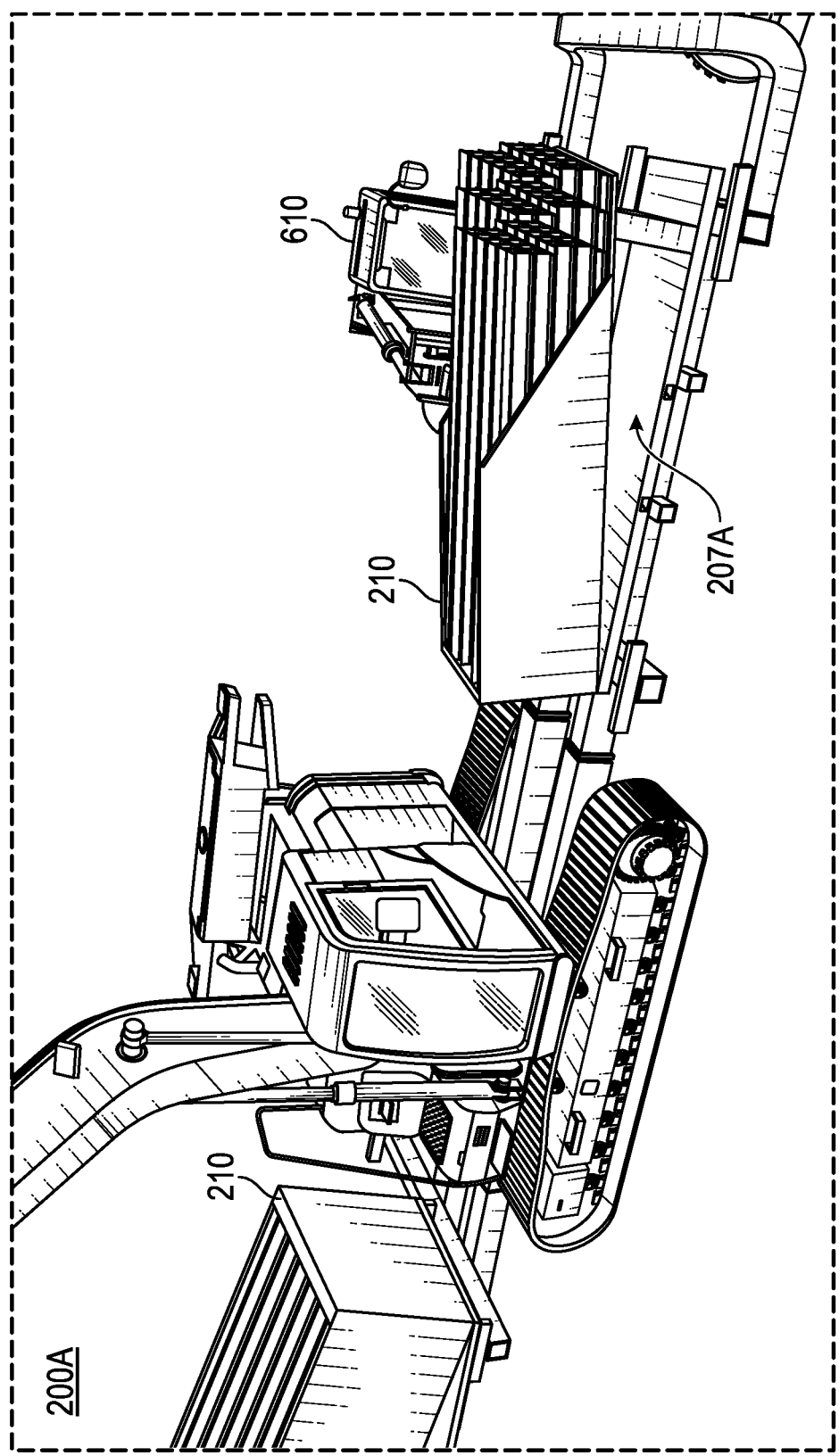
FIG. 6A depicts a basket loading operation performed by the AOV having the exemplary design shown in FIG. 2A, in accordance with some embodiments.

FIG. 6A depicts a basket loading operation for the pile driving AOV 200A of FIG. 2A, in accordance with some embodiments. In FIG. 6A, AOV 610 may be a basket loading AOV that is adapted to load assembled baskets 210 onto the pile driving AOV 200A. As explained previously, the basket 210 may house an ordered set of piles based on the path plan or the driving order of piles into the ground at respective locations of the pile plan map. In other embodiments, the basket 210 may house piles of a same type or a subset of types, and multiple baskets 210 of respective pile types or pile type subsets may be mounted to the carriage 207A such a pile of each type remains always accessible to the driving tool of the pile driving AOV 200A. Once the basket of piles has been assembled, the basket 210 may be loaded onto the carriage 207A of the pile driving AOV 200A. In some embodiments, the pile driving AOV 200A may be configured to autonomously navigate to a known reload point (e.g., a predetermined location or zone) where the basket loading operation may be performed autonomously. For example, the basket loading AOV 610 may be configured to operate in the predetermined reload zone and when the pile driving AOV 200A navigates to the reload zone, the basket loading AOV 610 may perform autonomous basket loading operation of loading one or more assembled basket of piles 210 onto the carriage 207A of the AOV 200A by placing the basket 210 onto the carriage 207A as shown in FIG. 6A. In the embodiment shown in FIG. 6A, the carriage 207A is adapted to be mounted with a plurality of baskets 210 on both sides of the main body of the pile driving AOV 200A.

Figure 6B:
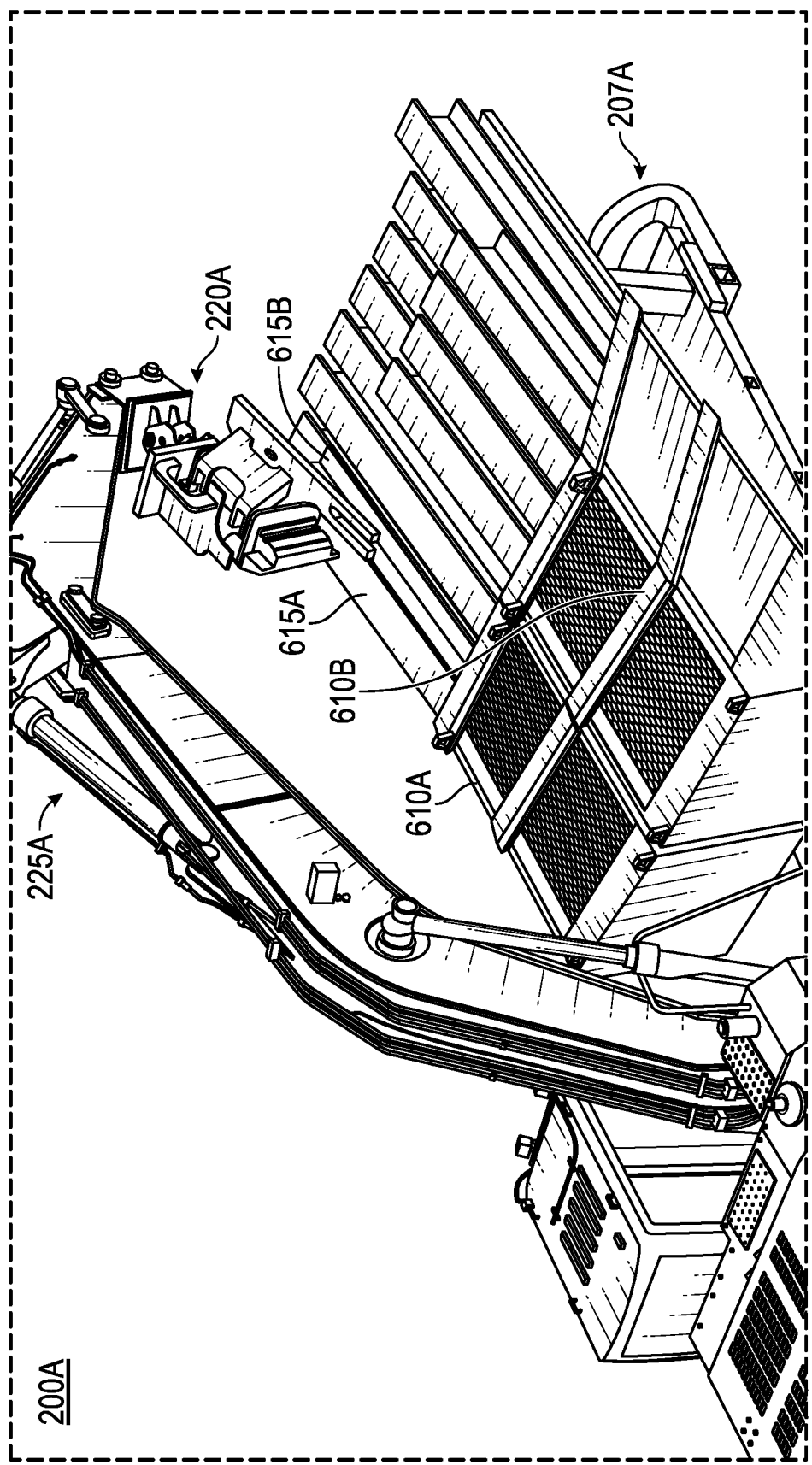
FIG. 6B depicts an autonomous pile loading operation performed by the AOV having the exemplary design shown in FIG. 2A, in accordance with some embodiments.

FIG. 6B depicts an autonomous pile loading operation for the pile driving AOV 200A of FIG. 2A, in accordance with some embodiments. In FIG. 6B, two baskets 610A-B of piles are shown as being loaded onto the carriage 207A of the pile driving AOV 200A. FIG. 6B depicts a state where the AOV 200A has been autonomously navigated by the navigation module 360 to a selected first location (based on the pile plan and the path plan) for pile driving. Further, FIG. 6B depicts a state where the pile 615A has a type (e.g., attributes like length, bolt hole pattern, design or shape, etc.) that accords with the pile parameters for the first location per the pile plan data 334. Further, based on data associated with the basket assembly operation and the basket loading operation, the pile loading module 365 "knows" where each pile for each driving location is positioned in the basket 610A, and "knows" where the basket 610A is positioned on the carriage 207A. Thus, based on data associated with the basket assembly operation and the basket loading operation, the pile loading module 365 can determine the exact position of the pile 615A in the basket 610A and on the carriage 207A. Based on the known (and/or verified by routine 366) position of the pile 615A, the pile loading module 365 may actuate one or more components of the articulated arm 225A and the drive tool 220A of the AOV 200A to pick up the pile 615A from the basket 610A and load the pile 615A onto the drive tool 220A of the AOV 200A during the pile loading operation. The pile loading module 365 may further actuate the one or more components to position the pile 615A at or above the first location for pile driving.

After completion of the pile driving at the first location and after autonomous navigation of the AOV 200A by the navigation module 360 to a next or second location (based on the pile plan and the path plan), the pile loading module 365 may repeat the above-described pile loading operation. For example, based on data associated with the basket assembly operation and the basket loading operation, the pile loading module 365 can determine the exact position of a pile 615B (that has a type that accords with the pile parameters for the second location per the pile plan data 334) in the basket 610A (or another location on or off the carriage 207A). Based on the known position of the pile 615B, the pile loading module 365 may actuate one or more components of the articulated arm 225A and the drive tool 220A of the AOV 200A to pick up the pile 615B from the basket 610A and load the pile 615B onto the drive tool 220A of the AOV 200A during the pile loading operation. The pile loading module 365 may further actuate the one or more components to position the pile 615B at or above the second location for pile driving.

Figure 6C:
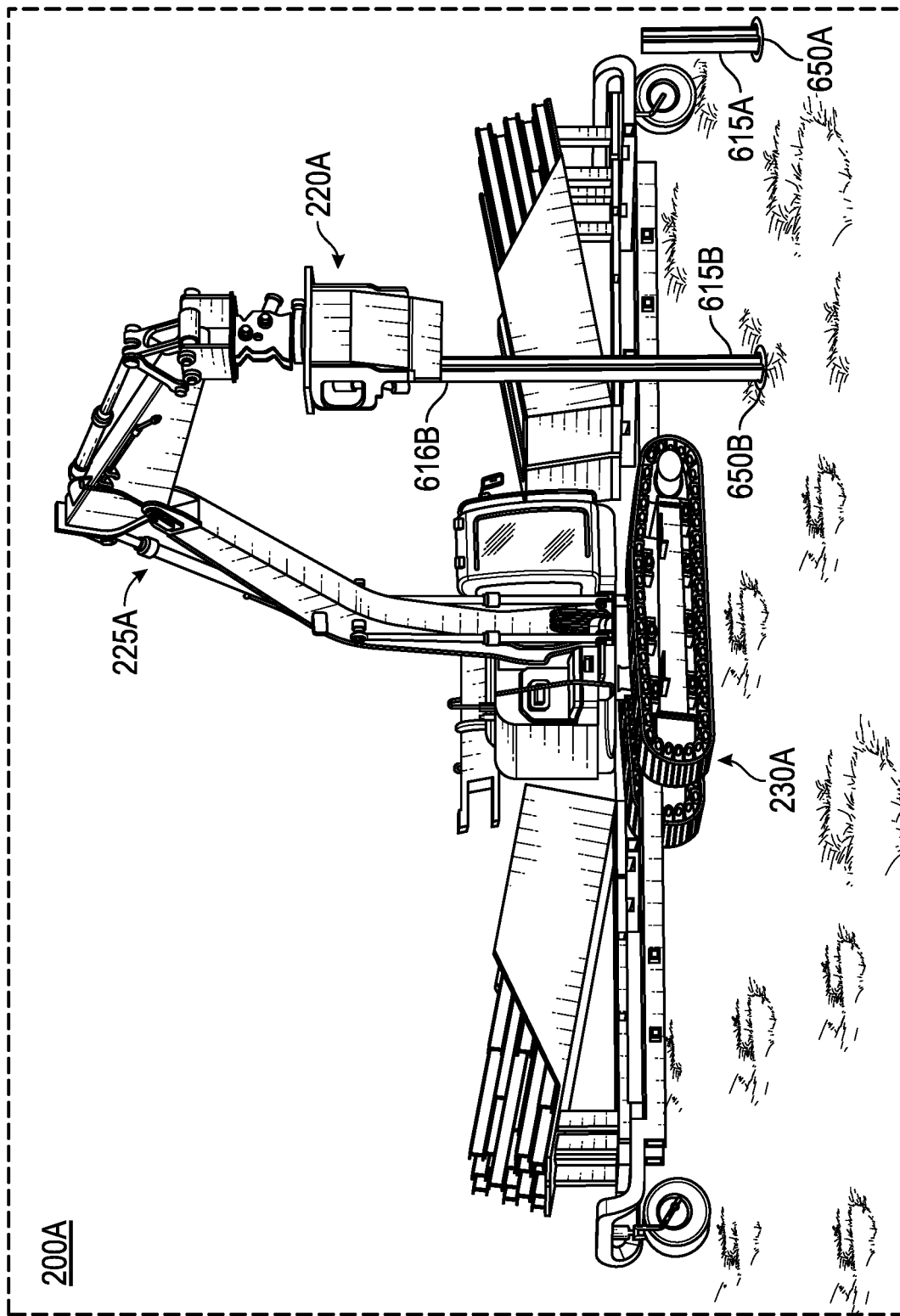
FIG. 6C depicts an autonomous pile driving operation performed by the AOV having the exemplary design shown in FIG. 2A, in accordance with some embodiments.

FIG. 6C depicts an autonomous pile driving operation for the pile driving AOV 200A of FIG. 2A, in accordance with some embodiments. Continuing with the above example of loading the piles 615A and 615B at respective first and second locations, FIG. 6C depicts a state where the first pile 615A has already been driven (to its intended state) into the ground by the driving tool 220A at the first location 650A, and the pile driving module 370 is now actuating one or more components of the articulated arm 225A and the driving tool 220A to drive the pile 615B into the ground at the second location 650B selected by the navigation module 360. It should be noted that the autonomous navigation operation by the navigation module 360 to autonomously navigate from the first location 650A to the second location 650B may simply involve (depending on distance between locations 650A and 650B) actuating one or more components of the articulated arm 225A or to rotate the main body of the AOV 220A without moving or driving the AOV 200A by actuating components of the drive system 230A.

During the pile driving operation, the pile driving module 370 may take as input the pile parameters included in the pile plan data 334 for the location (e.g., location 650B) to inform the pile driving operation for the pile 615B at the location 650B. For example, the driving tool 220A may use, e.g., hydraulic, electric, or other action to raise a weight and then drop it on the upper end 616B of the pile 615B to drive the pile into the ground. Non-limiting examples of the driving tool 220A may include a hydraulic hammer, a hydraulic press-in, a vibratory pile driver, and the like. Based on the one or more pile parameters, the pile driving module 370 may control (e.g., adjust or modify) the actuation parameters for one or more components of the driving tool 220A to achieve the intended state for the pile 615B after it has been driven into the ground. For example, the one or more parameters may specify the orientation of the pile 615B to be a predetermined orientation so that a bolt pattern on the pile 615B aligns with a component (e.g., solar panel) to be installed subsequently on top of the pile 615B. As another example, the one or more parameters may specify the height of the top 616B of the pile 615B as measured from a reference point (e.g., sea level) to be a predetermined height after the pile 615B has been driven into the ground. As yet another example, the one or more parameters may specify the plumbness of the pile 615B to be a predetermined plumbness after install. Thus, during the pile driving operation, the pile driving module 370 may actuate one or more components of the AOV 200A such that the driven pile 615B has attributes that match the input specified parameters of the predetermined orientation, height, plumbness, etc., as dictated by the pile plan data 334.

In some embodiments, the pile driving module 370 may monitor sensor data from one or more sensors (e.g., sensors of sensor array 310, component sensors 326, and the like) at a predetermined frequency (e.g., periodically or aperiodically) to inform or adjust the actuation parameters of the components of the AOV 200A during the operation to ensure the attributes (e.g., height, plumbness, orientation) of the pile 615B during the driving operation maintain an intended state or progress toward the intended state per the pile plan or otherwise stay within respective tolerance thresholds of the intended state.

Example Autonomous Quality Control Operation

Returning to FIG. 3B, another autonomous operation that may be performed by the control system 330 based on the pile plan data 334 may include the quality control operation. For example, the quality control module 380 may take the pile plan data 334 as input and monitor the pile driving operation performed by the pile driving module 370 and monitor the corresponding (co-occurring) sensor data from one or more sensors (e.g., sensors of sensor array 310, component sensors 326, and the like) to perform the quality control operation. By performing the quality control operation, the quality control module 380 may ensure for each driven pile at each location that the attributes (e.g., (x,y,z) location, orientation, etc.) of the driven pile (based on the sensor data) accord with the pile parameters for the location (based on the pile plan map). Configuration and functionality of the quality control module 380 is described below in connection with FIGS. 7 and 8.

Figure 7:
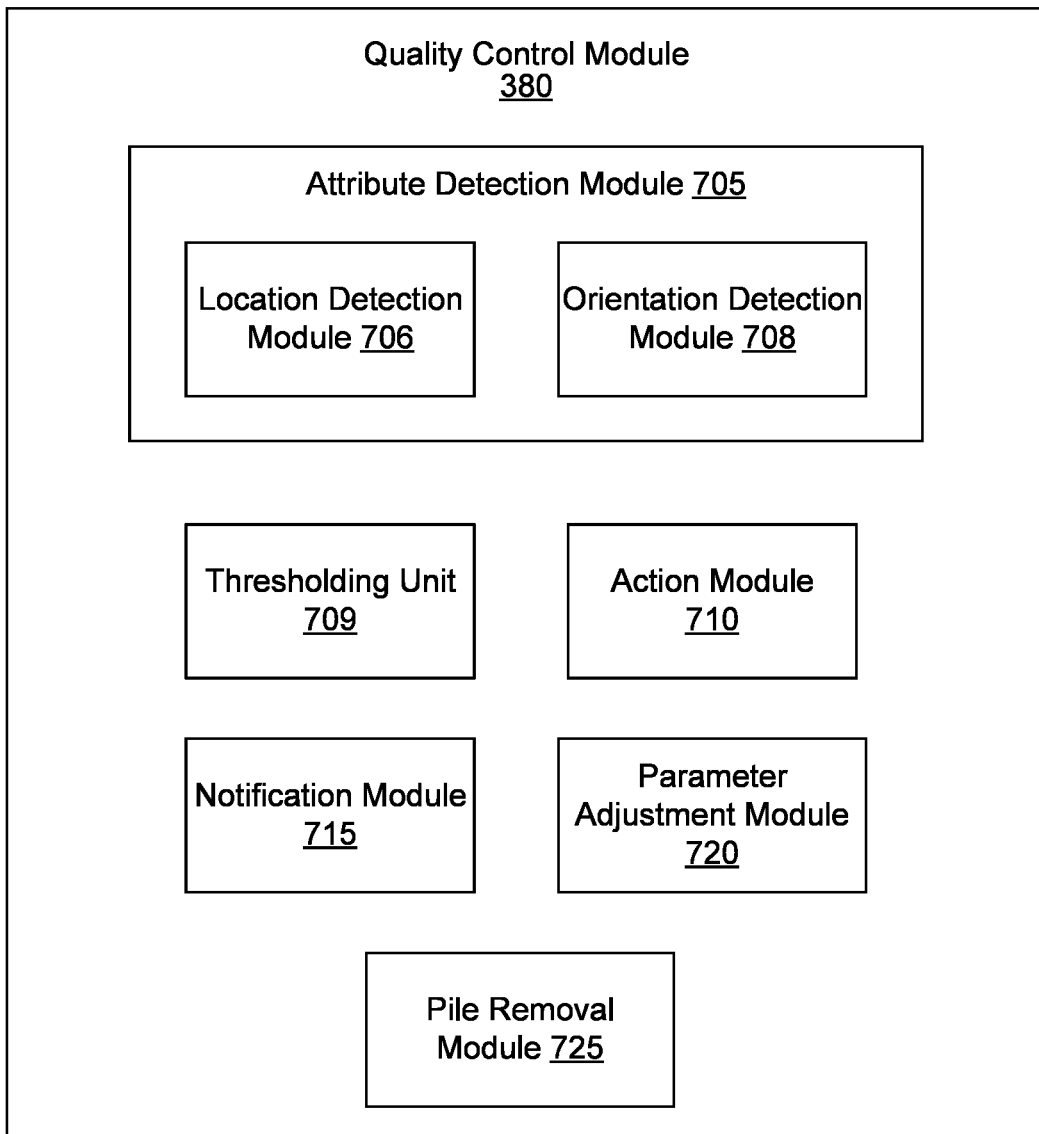
FIG. 7 is a block diagram of the quality control module of the control system of FIG. 3B, in accordance with some embodiments.

As shown in FIG. 7, the quality control module 380 may include an attribute detection module 705, a thresholding unit 709, an action module 710, a notification module 715, a parameter adjustment module 720, and a pile removal module 725. The attribute detection module 705 may include a location detection module 706 and an orientation detection module 708. In different embodiments, the quality control module 380 of FIG. 7 may include fewer or additional components. The quality control module 380 may also include different components.

The attribute detection module 705 may be configured to detect one or more attributes (e.g., location, orientation, etc.) of the pile using one or more sensors during or after the pile driving operation. The one or more attributes of the pile may correspond to a (current, actual, or final) state of the pile during or after the pile driving operation. In some embodiments, the sensor data based on which the one or more attributes are detected may be time-series data received by the attribute detection module 705 at a predetermined frequency (e.g., periodic or aperiodic) before, during, and/or after the pile driving operation.

The location detection module 706 may detect the (actual) location of the driven pile using the sensor data 337 during or after the pile driving operation. For example, the location detection module 706 may detect the (actual) horizontal and/or vertical location of the pile driven into the ground. The detected location may convey the xy location (e.g., geolocation, GPS location, latitude and longitude data, etc.) corresponding to the base of the pile where the pile makes contact with the ground; the xy and/or xyz location of the top of the pile in a point cloud model; the height (altitude) of the top of the pile relative to a reference point; a reveal height of the pile (e.g., how high the pile protrudes from the surface of the ground); the xy and/or xyz location of a feature (e.g., bolt hole, clamp, etc.) on the pile; and the like.

The orientation detection module 708 may detect the (actual) orientation (e.g., plumbness, verticality, angle, positioning, bearing, etc.) of the driven pile using the sensor data 337 during or after the pile driving operation. For example, the orientation detection module 708 may detect the real-time plumbness or verticality of the pile being driven into the ground. As another example, the orientation detection module 708 may detect the real-time 3D orientation or bearing of the pile (or of one or more features on the pile) being driven into the ground.

Other attributes that may be detected by the attribute detection module 705 based on the sensor data 337 may include pile refusal (e.g., pile not budging or driving further into the ground when threshold amount of force is applied to the top of the pile for a threshold time period or a requisite rate of driving movement is not achieved after a predetermined amount of time driving the pile with predetermined actuation parameters), a deformation (e.g., bend, etc.) of the pile, damage (e.g., crack or other manufacturing defect) to the pile, and the like.

The thresholding unit 709 may utilize the pile parameter data corresponding to the current pile driving location and included in the pile plan data 334 to determine for one or more of the attributes detected by the attribute detection module 705, whether the value of the attribute is within a corresponding tolerance range. For example, for each of one or more pile parameters, the pile plan data 334 may include a tolerance threshold, and the thresholding unit 709 may access this information to determine for each of one or more measured attributes, whether the actual measured value of the attribute of the pile is within the permissible range. The thresholding unit 709 may also be configured to predict based on the time-series sensor data whether a given attribute of the pile is trending toward exceeding the corresponding tolerance threshold.

This determination (or prediction) by the thresholding unit 709 may be performed at a predetermined frequency. For example, the determination may be performed at the same frequency as the frequency at which new sensor data becomes available and/or the attribute value detection is performed by the attribute detection module 705. As another example, the determination by the thresholding unit 709 may be performed at one or more predetermined inspection points that may be predefined in a pile driving operation timeline (e.g., any point during or after the pile driving operation). As yet another example, the determination may be performed based on a trigger condition. The trigger condition may be sensor-based (e.g., based on sensor data) or based on user input (e.g., user operating on a user interface element to trigger the determination). The determination or prediction frequency may be different for the different detected attributes. For example, for the location attribute, the thresholding unit 709 may at the start of the pile driving operation determine whether the xy location of the bottom of the pile driven into the ground (as determined based on the sensor data 337) accords with the xy location as dictated by the pile parameters of the pile plan data 334, by being within the prescribed permissible tolerance range. As another example, for the orientation attribute, the thresholding unit 709 may (periodically or aperiodically during the pile driving operation) predict whether the plumbness or verticality of the pile being driven into the ground (as determined based on the sensor data 337) is trending toward exceeding the prescribed permissible tolerance range with respect to the intended plumbness as dictated by the pile parameters of the pile plan data 334.

The thresholding unit 709 outputs a result of the determination or prediction as quality control condition data. For example, if the thresholding unit 709 determines that the plumbness or verticality of the pile being driven into the ground (as determined based on the sensor data 337) is outside the permissible tolerance range of the target plumbness, the thresholding unit 709 outputs this determination as quality control condition data. As another example, if the thresholding unit 709 predicts that the plumbness or verticality of the pile being driven into the ground (as determined based on the sensor data 337) is trending toward going outside the permissible tolerance range of the target plumbness, the thresholding unit 709 outputs this prediction as quality control condition data. As another example, if the thresholding unit 709 detects pile refusal based on the signal from the attribute detection module 705 and further detects that the pile refusal has exceeded corresponding tolerance threshold, the thresholding unit 709 may output the under-drive of the pile (e.g., height more than target height) as the quality control condition data. As another example, if the thresholding unit 709 detects pile over-drive based on the signal from the attribute detection module 705 and further detects that the pile height has fallen below the corresponding tolerance threshold for the target height, the thresholding unit 709 may output the over-drive of the pile (e.g., height less than target height) as the quality control condition data.

The action module 710 performs a quality control action in response to the thresholding unit 709 determining or predicting that the one or more attributes of the pile exceed (or are predicted to exceed) the respective tolerance thresholds. The action module 710 may perform the quality control action based on the quality control condition data corresponding to the determined or predicted offending attribute. For example, the action module 710 may operate notification module 715 to transmit a notification to an external device (e.g., central server 130 of FIG. 1) reporting the offending (or predicted to offend) attribute. The notification may include the corresponding quality control condition data from the thresholding unit 709. The notification may serve to inform a user to, e.g., switch over to performing the pile driving operation manually, or to otherwise intervene during the autonomous pile driving operation.

As another example, the action module 710 may operate the parameter adjustment module 720 to adjust or modify the actuation parameters of the driving tool of the pile driving AOV to perform corrective action during the pile driving operation to attempt to keep an attribute that is predicted to exceed the tolerance range to be within the tolerance range (or to attempt to bring an offending attribute back within the corresponding tolerance threshold). For example, in case the plumbness is predicted to exceed the tolerance threshold for the target plumbness by the time the driving operation is completed, the parameter adjustment module 720 may adjust the actuation parameters of the driving tool associated with the angle of impact of the driving tool on top of the pile to attempt to bring the plumbness of the pile closer to a desired plumbness and within the threshold tolerance.

Another example of the action may be to stop the pile driving operation prior to completion based on the determination or the prediction by the thresholding unit 709. The action module 710 may further annotate a quality control log with the quality control condition data associated with the location where the pile driving operation was stopped based on the determination or the prediction by the thresholding unit 709. As another example, the action module 710 may flag the location with the quality control issue in association with the corresponding quality control condition data in a quality control review map for subsequent manual inspection. As another example, based on a measured attribute significantly exceeding (or predicted to significantly exceed) a corresponding tolerance threshold, the action module 710 may be configured to control the pile removal module 725 to autonomously remove the pile from the ground (e.g., actuate a clamping tool to grab the pile and wiggle it out of the ground), so that the autonomous pile driving operation at the location may be restarted with a new pile. In some embodiments, instead of removing the pile, the quality control review map may be updated to mark the location where the pile driving operation was stopped based on the determination or the prediction by the thresholding unit 709.

Figure 8:
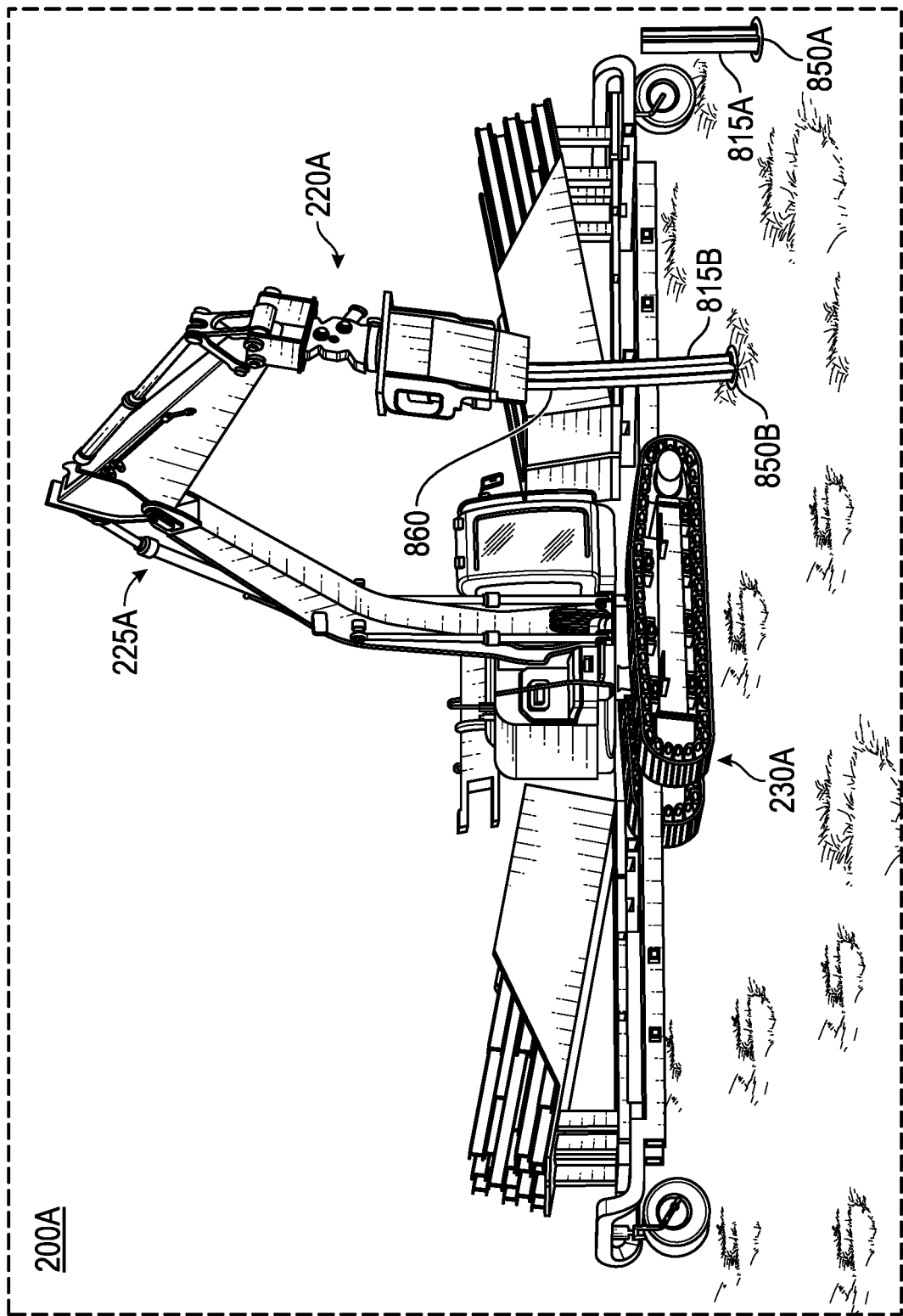
FIG. 8 depicts a quality control operation performed by the AOV having the exemplary design shown in FIG. 2A, in accordance with some embodiments.

The quality control operation is depicted and described in further detail below in connection with FIG. 8. FIG. 8 depicts the quality control operation for the pile driving AOV 200A of FIG. 2A, in accordance with some embodiments. FIG. 8 depicts an illustrative state where the first pile 815A has already been driven into the ground by the driving tool 220A at the first location 850A without quality control issues, and the pile driving module 370 is now performing the pile driving operation for the second pile 815B at the second location 850B by actuating one or more components of the articulated arm 225A and the driving tool 220A to drive the second pile 815B into the ground at the second location 850B.

In this case, for example, the pile parameters for both the locations 850A and 850B may indicate the same target pile height H, and as shown in FIG. 8, the driving tool 220A of the AOV 200A may drive the pile 815A into to ground to match the target height H at the location 850A. However, as shown in FIG. 8, while the driving tool 220A of the AOV 200A is driving the pile 815B into the ground at the location 850B to achieve the target height H, the pile 815B may be driven to refusal prior to reaching the target height H and start bending (at 860). The pile attributes of refusal and bending may be detected by the attribute detection module 705 based on the co-occurring time-series sensor data 337. And the thresholding unit 709 may further detect that the pile refusal and/or pile bending has exceeded corresponding tolerance thresholds, and output corresponding quality control condition data (e.g., data indicating the pile height is more than the target height and exceeds the corresponding height tolerance threshold, image or other sensor data indicating pile is bent). Based on the quality control condition data, the action module 710 may perform one or more actions. For example, for the location 850B, the action module 710 may control to stop the actuation of the drive tool 220A of the AOV 200A to immediately stop the pile driving operation for the location 850B prior to its completion and notify an operator or flag the location (and corresponding data) in a map or a log for further manual inspection. As another example, the action module 710 may control the pile removal module 725 to control actuation of the drive tool 220A of the AOV 200A to grab the bent/deformed pile 815B and wiggle the bent pile 815B to remove it from the location 850B autonomously, so that a new pile can be installed at or near the location 850B.

Example Obstacle Map Creation Operation

Returning to FIG. 3B, another operation that may be performed by the control system 330 may include the obstacle map creation operation. For example, based on the autonomous navigation operation, the autonomous pile driving operation and/or the autonomous quality control operation, the obstacle mapping module 390 may generate an obstacle map indicating locations of obstacles within the geographic area. By performing the obstacle map creation operation, the obstacle mapping module 390 may ensure efficient autonomous navigation and path planning for each AOV in the geographic area. Features of the obstacle mapping module 390 are described below in connection with FIG. 9. An example obstacle map generated by the obstacle mapping module 390 is depicted and described below in connection with FIG. 10. In some embodiments, the obstacle map may simply be a log of geolocation data corresponding to the obstacles.

Figure 9:
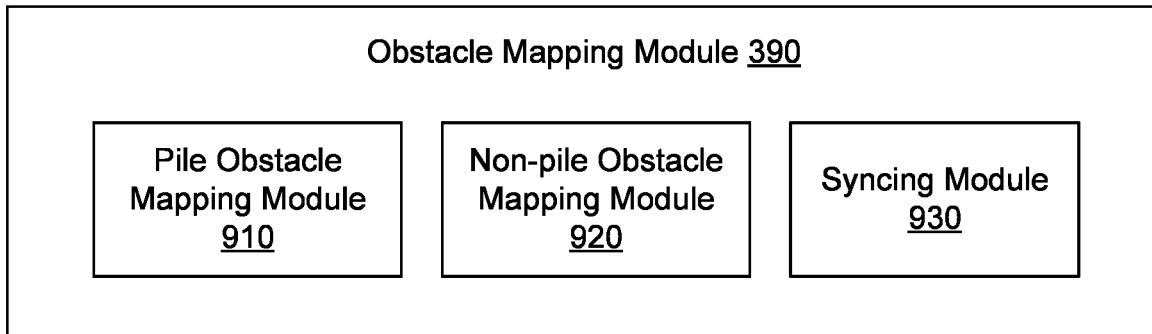
FIG. 9 is a block diagram of the obstacle mapping module of the control system of FIG. 3B, in accordance with some embodiments.

As shown in FIG. 9, the obstacle mapping module 390 may include a pile obstacle mapping module 910, a non-pile obstacle mapping module 920, and a syncing module 930. In different embodiments, the obstacle mapping module 390 of FIG. 9 may include fewer or additional components. The obstacle mapping module 390 may also include different components.

The pile obstacle mapping module 910 may be configured to generate obstacle data 336 of an obstacle map (see FIG. 10) indicating locations of obstacles within the geographic area. The obstacle data 336 may be generated for each location of the pile plan map where the pile driving operation has been completed. An obstacle may be any object or thing that defines a volume of space within the geographic area that is not navigable by an AOV or by a component (e.g., mechanical arm or driving tool) of the AOV. For example, in response to the autonomous navigation operation of the AOV to a first location based on the path plan, and in response to performance of the pile driving operation at the first location (and optionally, passing the quality control check), the pile obstacle mapping module 910 may generate the obstacle data 336 of the obstacle map (or update/modify the obstacle data 336 of the obstacle map) to include a representation of the pile at the first location. Subsequent pile driving operations at subsequent locations may result in similar modifications to the obstacle data 336 of the obstacle map to include representations of the piles at the subsequent locations.

The representations of the piles at the respective locations may include pile obstacle information including one or more of pile height information (e.g., pile reveal height, pile height relative to a reference point, etc.), pile location information (e.g., horizontal location of the bottom and/or top of the pile, horizontal or vertical location of the top of the pile, etc.), pile volume information (e.g., depth information, point cloud model data, etc.), and discretized pile information (e.g., 3D discretized pile volume data). For example, the pile obstacle information may correspond to the (final state of the) pile attributes detected by the attribute detection module 705 of the quality control module 380.

The obstacle data 336 may be generated or the obstacle map may be modified in real-time. Thus, continuing with the above example, after modifying the obstacle map to include the obstacle data 336 for the first location, in response to the autonomous navigation operation of the AOV to a second location based on the path plan, and in response to performance of the pile driving operation at the second location (and optionally, passing the quality control check), the pile obstacle mapping module 910 may generate the obstacle data 336 of the obstacle map (or update/modify the obstacle data 336 of the obstacle map that has already been modified previously to include the obstacle data 336 of the first location) to include a representation of the pile at the second location.

The non-pile obstacle mapping module 920 may also be configured to generate the obstacle data 336 of an obstacle map (see FIG. 10) indicating locations of (non-pile) obstacles within the geographic area. The obstacle data 336 generated by the non-pile obstacle mapping module 920 perceptually based on sensor data captured by an AOV. The obstacle data 336 data 336 generated by the non-pile obstacle mapping module 920 may correspond to non-pile obstacles including static obstacles (e.g., trenches, dirt piles, electric poles, etc.) or dynamic obstacles (e.g., AOVs or other vehicles, humans, etc.) within the geographic area that are perceived by the non-pile obstacle mapping module 920 based on the time-series sensor data 337. Techniques known to those skilled in the art (e.g., computer vision, image segmentation, machine learning based techniques, etc.) may be employed to detect the static or dynamic obstacles in the geographic area.

The non-pile obstacles detected by the non-pile obstacle mapping module 920 may be autonomously perceived when the AOV is performing other manual or autonomous operations (e.g., navigation operation, pile loading operation, pile driving operation, basket loading operation, pile distribution operation, quality control operation, etc.). Representations of the non-pile obstacles detected by the non-pile obstacle mapping module 920 include obstacle information similar to the pile obstacle information described above in connection with the pile obstacle mapping module 910. for example, the obstacle data 337 corresponding to the non-pile obstacle information may include obstacle height information, obstacle location information (e.g., horizontal or vertical location of the obstacle etc.), obstacle volume information (e.g., depth information, point cloud model data, etc.), and discretized obstacle information (e.g., 3D discretized pile volume data).

The syncing module 930 may be configured to synchronize and update in real-time, the obstacle data 337 of the obstacle map across multiple AOVs based on (pile and non-pile) obstacle mapping operations simultaneously being performed by multiple AOVs. The synced obstacle data 337 may then be broadcast to all AOVs operating in the geographic area so that performance of operations by the multiple AOVs like the path planning operation, the navigation operation, the pile loading operation, the pile driving operation, and the like, accounts for all of the obstacles within the geographic area. In some embodiments, the syncing module 930 may be configured to transmit a local state of the obstacle data 337 to a central server (e.g., server 130 of FIG. 1) periodically or based on other criteria (e.g., every time an update is made to the local state of the map, user operation, etc.). The server may be configured to maintain a master state of the obstacle data 337 based on respective local state updates received from one or more AOVs operating in the geographic area. The server may further be configured to broadcast the master state of the obstacle map to the respective one or more AOVs to update the local state at each AOV. Based on the received broadcast of the master state, the syncing module 930 may update the local state of the obstacle map, thereby syncing the obstacle data 337 of the obstacle map with the server. The autonomous operation by the AOV may then be performed based on the updated local state of the obstacle map of the AOV.

Thus, for example, the autonomous navigation operation by a first AOV may be based on an update to an obstacle map that is updated to include a (pile or non-pile) obstacle by a second AOV. The first AOV may thus be navigated (or a component of the first AOV operated to perform, e.g., an arm actuation operation, a pile loading operation, a pile driving operation, etc.) to avoid not only obstacles added to the map by the first AOV, but also obstacles added to the obstacle map by the second AOV.

Figure 10:
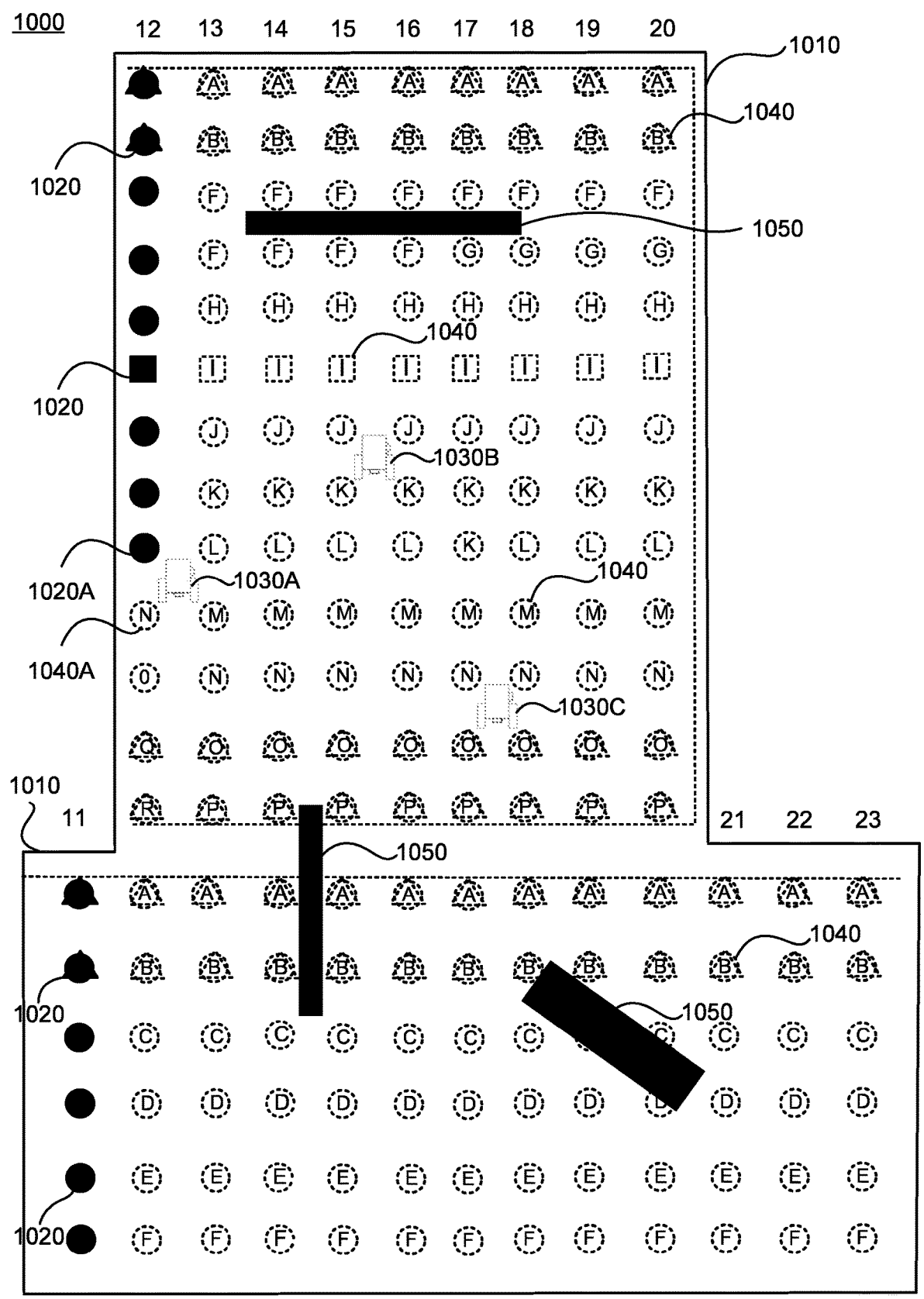
FIG. 10 illustrates an exemplary obstacle map generated and modified by the obstacle mapping module of FIG. 9, in accordance with some embodiments.

FIG. 10 depicts an example obstacle map 1000 generated by the obstacle mapping module 390, in accordance with some embodiments. In some embodiments, the obstacle map 1000 may correspond to the pile plan map (e.g., see FIG. 4). The obstacle map 1000 may represent an "as-built" or real-time state of the pile driving operation being carried out autonomously in the geographic area 1010 by one or more AOVs. FIG. 10 depicts an illustrative state where the pile driving operation for all of the locations 1020 in column 11 (e.g., six locations 1020 as shown and marked as solid shapes) in the geographic area 1010 has already been completed, and the obstacle data 337 corresponding to the locations 1020 in column 11 has already been generated and recorded in the obstacle map 1000. The illustrative state of FIG. 10 further depicts that in column 12, the obstacle data 337 corresponding to the first nine locations 1020 (marked as solid shapes) has already been generated and recorded in the obstacle map 1000. The obstacle map 1000 may also show (and corresponding obstacle data 337 include) locations 1040 corresponding to columns 12-20 where the pile driving operation has still not been performed. Such locations 1040 are shown with broken lines in FIG. 10.

For each location 1020, the obstacle data 337 may include the pile obstacle information as explained above. Although not specifically shown in FIG. 10, the obstacle data 337 for each location 1020 may also convey, e.g., depth information, point cloud model data, 3D discretized pile volume data, and the like. Using the pile obstacle information corresponding to the pile obstacles at each location 1020, the one or more AOVs (e.g., AOVs 1030A, 1030B, and 1030C in FIG. 10) in the geographic area 1010 may be operated so as to avoid the obstacles while performing the variety of autonomous operations according to the present disclosure (e.g., navigation operation, component actuation operation, path planning operation, pile loading operation, pile driving operation, etc.).

FIG. 10 depicts the state where the obstacle data 336 for the location 1020A has already been generated by the AOV 1030A and the obstacle map 1000 modified for the location 1020A. FIG. 10 further depicts the state where the AOV 1030A is now going to perform the autonomous operations including the pile driving operation for the location 1040A. After the performance of the pile driving operation at the location 1040A (and optionally, passing the quality control check), the pile obstacle mapping module 910 may similarly generate the obstacle data 336 (i.e., the pile obstacle information) for the location 1040A, update the map based on the generated data 337, and move on to the next location.

The pile obstacle mapping operation described above may also simultaneously be performed by other AOVs 1030B and 1030C, and the obstacle data 336 generated by the other AOVs 1030B and 1030C may also be added to the same obstacle map 1000 in real-time. The updated obstacle map 1000 may then be made accessible to all of the AOVs 1030 so that the autonomous operations performed by each AOV 1030 may be based on the obstacle map 1000 that has been updated to include all obstacles.

FIG. 10 also depicts static non-pile obstacles (e.g., trenches, dirt piles, construction equipment, etc.) 1050 that may be perceived by one or more of the AOVs 1030 while performing other operations (e.g., navigation operation) using the sensor data 337, and the obstacle data 337 corresponding to the obstacles 1050 generated and added into the obstacle map 1000. Each AOV 1030 may also detect dynamic non-pile obstacles like the other AOVs 1030, other vehicles, humans, etc., based on the sensor data, and add the obstacle data 337 corresponding to the dynamic obstacles 1030 into the obstacle map 1000. One or more of the non-pile obstacles 1050 of FIG. 10 may also correspond to an obstacle that is manually added to the obstacle map 1000 by a user. For example, an "as-built" file with geolocation data (e.g., GPS coordinates) of known obstacles may be uploaded by a user to the system and the obstacle map 1000 may be updated to include the obstacles identified in the uploaded file.

Thus, more generally, for each obstacle (e.g., 1020, 1030, 1050) tagged in the map 1000, the obstacle map 1000 may include obstacle attribute information such as identity, type or category of the object, physical characteristics of the object, 3D location of the object, depth of the object, point cloud model of the object, discretized model of the object, and the like. The obstacle map 1000 may thus convey 3D non-navigable regions to inform AOV or AOV tool path planning within the geographic area 1010 (e.g., minimum height a tool of the AOV needs to be to avoid hitting the pile that has been driven into the ground and that has a certain reveal height). The obstacles may include as-built obstacles like piles that have been installed by the AOV at locations prescribed by the pile plan map, or non-pile static or dynamic obstacles perceived or detected based on sensor data.

Example Methods

FIG. 11 is a flow chart 1100 illustrating a process for generating basket assembly instructions, in accordance with some embodiments. It should be noted that the process illustrated herein can include fewer, different, or additional steps in other embodiments. Process 1100 may be performed by a control system (e.g., control system 330 of FIG. 3B). The control system 330 may access 1110 a pile plan map (e.g., FIG. 4) indicating a plurality of locations within a geographic area at which piles are to be installed. The control system 330 may generate 1120 an obstacle map (e.g., FIG. 10) indicating locations of obstacles within the geographic area. The control system 330 may autonomously navigate 1130 the AOV to a first location of the plurality of locations using the pile plan map. The control system 330 may, in response to driving a pile into the ground at the first location, modify 1140 the obstacle map (e.g., location 1020A in FIG. 10) to include a representation of the pile at the first location.

FIG. 12 is a flow chart 1200 illustrating a process of autonomously driving a plurality of piles into the ground, in accordance with some embodiments. It should be noted that the process illustrated herein can include fewer, different, or additional steps in other embodiments. Process 1200 may be performed by a control system (e.g., control system 330 of FIG. 3B). The control system 330 may access 1210 a pile plan map (e.g., FIG. 4) indicating a plurality of locations in a geographic area at which piles are to be installed. The control system 330 may select 1220 a first location and a second location (e.g., locations 650A and 650B in FIG. 6C) from the plurality of locations using the pile plan map. The control system 330 may autonomously navigate 1230 the AOV to the first location (e.g., location 650A FIG. 6C). The control system 330 may autonomously load 1240 a first pile (e.g., pile 615A in FIG. 6B) onto a driving tool of the AOV. The control system 330 may autonomously drive 1250 the first pile into the ground at the first location (e.g., pile 615A at location 650A in FIG. 6C). The control system 330 may autonomously navigate 1260 the AOV to the second location (e.g., location 650B in FIG. 6C). The control system 330 may autonomously load 1270 a second pile (e.g., pile 615B in FIG. 6B) onto the driving tool. The control system 330 may autonomously drive 1280 the second pile into the ground at the second location using the driving tool (e.g., pile 615B at location 650B in FIG. 6C).

FIG. 13 is a flow chart 1300 illustrating a process of performing an autonomous quality control operation for autonomously driven piles, in accordance with some embodiments. It should be noted that the process illustrated herein can include fewer, different, or additional steps in other embodiments. Process 1300 may be performed by a control system (e.g., control system 330 of FIG. 3B). The control system 330 may access 1310 a pile plan map (e.g., FIG. 4) indicating a plurality of locations in a geographic area at which piles are to be installed. The control system 330 may identify 1320 a first set of locations from the plurality of locations and a first set of piles to be driven into the ground at the first set of locations using the pile plan map. The control system 330 may identify 1330 an order for driving the first set of piles into the ground and a pile type for each of the first set of piles. The control system 330 may generate 1340 basket assembly instructions for assembling the first set of piles into a basket based on the identified order and the identified pile types.

FIG. 14 is a flow chart 1400 illustrating a process of performing an autonomous obstacle map creation operation based on autonomously driven piles, in accordance with some embodiments. It should be noted that the process illustrated herein can include fewer, different, or additional steps in other embodiments. Process 1400 may be performed by a control system (e.g., control system 330 of FIG. 3B). The control system 330 may autonomously perform 1410 a pile driving operation (e.g., FIG. 6C) by driving a pile into the ground at a location identified by a pile plan map (e.g., FIG. 4). The control system 330 may detect 1420 one or more attributes of the pile using one or more sensors during or after the pile driving operation. The control system 330 may determine 1430 whether the one or more attributes of the pile exceed respective tolerance thresholds (e.g., bent pile in FIG. 8). The control system 330 may perform 1440 a quality control action in response to determining that the one or more attributes of the pile exceed the respective tolerance thresholds.

Example Computer System

Figure 15:
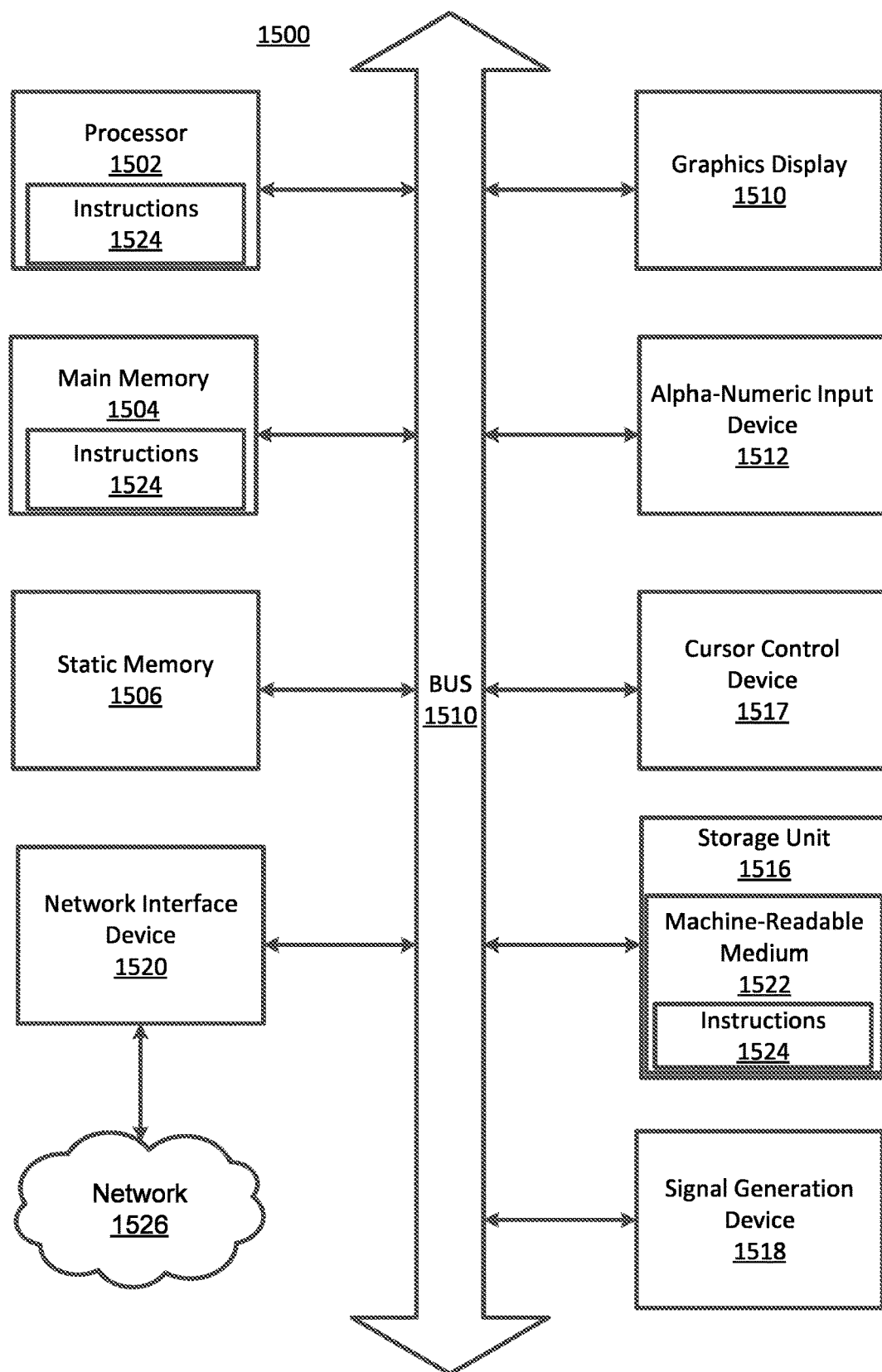
FIG. 15 is a block diagram illustrating components of an example machine for reading and executing instructions from a machine-readable medium, in accordance with one or more example embodiments.

FIG. 15 is a block diagram illustrating components of an example machine for reading and executing instructions from a machine-readable medium, in accordance with one or more example embodiments.

FIG. 15 is a block diagram illustrating components of an example machine for reading and executing instructions from a machine-readable medium, in accordance with one or more example embodiments. Specifically, FIG. 15 shows a diagrammatic representation of one or more of the central server 130 of FIG. 1, the client device 140 of FIG. 1, the control system 330 of FIGS. 3A-3B, the basket assembly module 355 of FIG. 5, the quality control module 380 of FIG. 7, the obstacle mapping module 390 of FIG. 7, and machines for performing the processes 1100-1400 of FIGS. 11-14, in the example form of a computer system 1500.

The computer system 1500 can be used to execute instructions 1524 (e.g., program code or software) for causing the machine to perform any one or more of the methodologies (or processes) or modules described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes one or more processing units (generally processor 1502). The processor 1502 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 1500 also includes a main memory 1504. The computer system may include a storage unit 1516. The processor 1502, memory 1504, and the storage unit 1516 communicate via a bus 1508.

In addition, the computer system 1500 can include a static memory 1506, a graphics display 1510 (e.g., to drive a plasma display panel (PDP), a liquid crystal display (LCD), or a projector). The computer system 1500 may also include an alphanumeric input device 1512 (e.g., a keyboard), a cursor control device 1517 (e.g., a mouse, a trackball, a joystick, a motion sensor, or other pointing instrument), a signal generation device 1518 (e.g., a speaker), and a network interface device 1520, which also are configured to communicate via the bus 1508.

The storage unit 1516 includes a machine-readable medium 1522 on which is stored instructions 1524 (e.g., software) embodying any one or more of the methodologies or functions described herein. For example, the instructions 1524 may include the functionalities of modules of one or more of the central server 130 of FIG. 1, the client device 140 of FIG. 1, the control system 330 of FIGS. 3A-3B, the basket assembly module 355 of FIG. 5, the quality control module 380 of FIG. 7, the obstacle mapping module 390 of FIG. 7, and the machines for performing the processes 1100-1400 of FIGS. 11-14. The instructions 1524 may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 may be transmitted or received over a network 1526 via the network interface device 1520.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method performed by an autonomous off-road vehicle (AOV), the method comprising:
   autonomously loading a pile onto an arm of the AOV;
   performing an autonomous pile driving operation of autonomously driving the pile into the ground at a location identified by a pile plan map;
   detecting one or more attributes of the pile at a predetermined frequency using one or more sensors during the autonomous pile driving operation;
   determining whether at least one of the one or more attributes of the pile is projected to exceed a corresponding tolerance threshold based on an observed trend of the one or more attributes during the autonomous pile driving operation; and
   performing a quality control action by stopping the autonomous pile driving operation in response to determining that the at least one of the one or more attributes of the pile is projected to exceed the corresponding tolerance threshold before the at least one attribute exceeds the corresponding tolerance threshold.

2. The method of claim 1, wherein the one or more attributes include one or more of a location and an orientation of the pile.

3. The method of claim 1, further comprising generating quality control condition data in response to determining that the at least one of the one or more attributes of the pile is projected to exceed the corresponding tolerance threshold.

4. The method of claim 3, wherein performing the quality control action further comprises at least one of:
   transmitting a notification including the quality control condition data to a central server;
   annotating a quality control log with the quality control condition data and the location identified by the pile plan map; and
   flagging the location in a quality control review map in association with the quality control condition data for manual inspection.

5. The method of claim 1, further comprising autonomously adjusting one or more actuation parameters of one or more components of the AOV for the autonomous pile driving operation in response to determining that the at least one of the one or more attributes of the pile is projected to exceed the corresponding tolerance threshold.

6. The method of claim 1, further comprising, after the autonomous pile driving operation is autonomously stopped at the location, autonomously performing the autonomous pile driving operation at a next location identified by the pile plan map.

7. The method of claim 1, wherein performing the quality control action further comprises notifying an operator for manual intervention during the autonomous pile driving operation.

8. The method of claim 1, wherein performing the quality control action further comprises:
   autonomously performing a pile removal operation of removing the pile from the ground at the location identified by the pile plan map; and
   restarting the autonomous pile driving operation.

9. The method of claim 1, wherein detecting the one or more attributes of the pile at the predetermined frequency comprises detecting at least one of a pile plumbness, a pile horizontal location, a pile vertical location, a pile orientation, a pile rotation, a pile reveal height, a pile deformation, a pile refusal, and a pile damage condition.

10. An autonomous off-road vehicle (AOV) comprising:
a hardware processor; and
a non-transitory computer-readable storage medium storing executable instructions that, when executed by the hardware processor, cause the hardware processor to perform steps comprising:
autonomously loading a pile onto an arm of the AOV;
performing an autonomous pile driving operation of autonomously driving the pile into the ground at a location identified by a pile plan map;
detecting one or more attributes of the pile at a predetermined frequency using one or more sensors during the autonomous pile driving operation;
determining whether at least one of the one or more attributes of the pile is projected to exceed a corresponding tolerance threshold based on an observed trend of the one or more attributes during the autonomous pile driving operation; and
performing a quality control action by stopping the autonomous pile driving operation in response to determining that the at least one of the one or more attributes of the pile is projected to exceed the corresponding tolerance threshold before the at least one attribute exceeds the corresponding tolerance threshold.

11. The AOV of claim 10, wherein the one or more attributes include one or more of a location and an orientation of the pile.

12. The AOV of claim 10, wherein the instructions further cause the hardware processor to perform a step comprising generating quality control condition data in response to determining that the at least one of the one or more attributes of the pile is projected to exceed the corresponding tolerance threshold.

13. The AOV of claim 12, wherein the instructions that cause the hardware processor to perform the step comprising performing the quality control action further comprise instructions that, when executed by the hardware processor, cause the hardware processor to perform a step comprising at least one of:
transmitting a notification including the quality control condition data to a central server;
annotating a quality control log with the quality control condition data and the location identified by the pile plan map; and
flagging the location in a quality control review map in association with the quality control condition data for manual inspection.

14. The AOV of claim 12, wherein the instructions, when executed by the hardware processor, further cause the hardware processor to perform a step comprising autonomously adjusting one or more actuation parameters of one or more components of the AOV for the autonomous pile driving operation in response to determining that the at least one of the one or more attributes of the pile is projected to exceed the corresponding tolerance threshold.

15. The AOV of claim 10, wherein the instructions that cause the hardware processor to perform the step comprising detecting the one or more attributes of the pile at the predetermined frequency comprise instructions that, when executed by the hardware processor, cause the hardware processor to perform a step comprising detecting at least one of a pile plumbness, a pile horizontal location, a pile vertical location, a pile orientation, a pile rotation, a pile reveal height, a pile deformation, a pile refusal, and a pile damage condition.

16. A non-transitory computer-readable storage medium storing executable instructions that, when executed by a hardware processor, cause the hardware processor to perform steps comprising:
autonomously loading a pile onto an arm of an autonomous off-road vehicle (AOV);
performing an autonomous pile driving operation of autonomously driving the pile into the ground at a location identified by a pile plan map;
detecting one or more attributes of the pile at a predetermined frequency using one or more sensors during the autonomous pile driving operation;
determining whether at least one of the one or more attributes of the pile is projected to exceed a corresponding tolerance threshold based on an observed trend of the one or more attributes during the autonomous pile driving operation; and
performing a quality control action by stopping the autonomous pile driving operation in response to determining that the at least one of the one or more attributes of the pile is projected to exceed the corresponding tolerance threshold before the at least one attribute exceeds the corresponding tolerance threshold.

17. The non-transitory computer-readable storage medium of claim 16, wherein the one or more attributes include one or more of a location and an orientation of the pile.

18. The non-transitory computer-readable storage medium of claim 16, wherein the instructions further cause the hardware processor to perform a step comprising generating quality control condition data in response to determining that the at least one of the one or more attributes of the pile is projected to exceed the corresponding tolerance threshold.

19. The non-transitory computer-readable storage medium of claim 18, wherein the instructions that cause the hardware processor to perform the step comprising performing the quality control action further comprise instructions that, when executed by the hardware processor, cause the hardware processor to perform a step comprising at least one of:
transmitting a notification including the quality control condition data to a central server;
annotating a quality control log with the quality control condition data and the location identified by the pile plan map; and
flagging the location in a quality control review map in association with the quality control condition data for manual inspection.

20. The non-transitory computer-readable storage medium of claim 16, wherein the instructions, when executed by the hardware processor, further cause the hardware processor to perform a step comprising autonomously adjusting one or more actuation parameters of one or more components of the AOV for the autonomous pile driving operation in response to determining that the at least one of the one or more attributes of the pile is projected to exceed the corresponding tolerance threshold.

\* \* \* \* \*